(12) United States Patent
Leleannec et al.

(10) Patent No.: US 11,483,562 B2
(45) Date of Patent: Oct. 25, 2022

(54) METHOD AND APPARATUS FOR VIDEO ENCODING AND DECODING BASED ON CONTEXT SWITCHING

(71) Applicant: InterDigital VC Holdings, Inc., Wilmington, DE (US)

(72) Inventors: Fabrice Leleannec, Cesson-Sevigne (FR); Tangi Poirier, Cesson-Sevigne (FR); Ya Chen, Cesson-Sevigne (FR); Edouard Francois, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/955,859

(22) PCT Filed: Dec. 12, 2018

(86) PCT No.: PCT/US2018/065156
§ 371 (c)(1),
(2) Date: Jun. 19, 2020

(87) PCT Pub. No.: WO2019/125859
PCT Pub. Date: Jun. 27, 2019

(65) Prior Publication Data
US 2020/0322610 A1    Oct. 8, 2020

(30) Foreign Application Priority Data

Dec. 22, 2017  (EP) ..................................... 17306896

(51) Int. Cl.
*H04N 19/13*    (2014.01)
*H04N 19/157*   (2014.01)
(Continued)

(52) U.S. Cl.
CPC ........... *H04N 19/13* (2014.11); *H04N 19/157* (2014.11); *H04N 19/176* (2014.11); *H04N 19/96* (2014.11)

(58) Field of Classification Search
CPC .... H04N 19/13; H04N 19/157; H04N 19/176; H04N 19/96
See application file for complete search history.

(56) References Cited

U.S. PATENT DOCUMENTS

2012/0020408 A1   1/2012   Chen et al.
2012/0082231 A1   4/2012   Rojals et al.
(Continued)

FOREIGN PATENT DOCUMENTS

CN    1656817 A       8/2005
CN    102939755 A     2/2013
(Continued)

OTHER PUBLICATIONS

Alshin et al., "Multi-Parameter Probability up-date for CABAC", Joint Collaborative Team on Video Coding (JCT-VC) of ITU-T SG16 WP3 and ISO/IEC JTC1/SC29/WG11, Document: JCTVC-F254, 6th Meeting, Torino, Italy, Jul. 14, 2011, 5 pages.
(Continued)

*Primary Examiner* — Alison Slater
*Assistant Examiner* — Shanika M Brumfield
(74) *Attorney, Agent, or Firm* — Condo Roccia Koptiw LLP

(57) ABSTRACT

Methods and apparatuses for video coding and decoding are provided. The method of video encoding includes accessing (1410) a bin of a syntax element associated with a block in a picture of a video, determining (1420) a context for the bin of the syntax element from a set of contexts associated with a block type of the block, the set of contexts including at least a first context and a second context, the second context
(Continued)

being associated with a larger number of block types than the first context and entropy encoding (1430) the bin of the syntax element based on the determined context. A bitstream formatted to include encoded data, a computer-readable storage medium and a computer-readable program product are also described.

14 Claims, 13 Drawing Sheets

(51) Int. Cl.
*H04N 19/176* (2014.01)
*H04N 19/96* (2014.01)

(56) References Cited

U.S. PATENT DOCUMENTS

| 2012/0082232 | A1* | 4/2012 | Sole Rojals | H04N 19/149 375/240.18 |
| 2012/0177300 | A1* | 7/2012 | Sasai | H04N 19/91 382/233 |
| 2014/0362925 | A1* | 12/2014 | Nguyen | H03M 7/4018 375/240.18 |
| 2016/0353111 | A1 | 12/2016 | Zhang et al. | |
| 2018/0324464 | A1* | 11/2018 | Zhang | H04N 19/176 |
| 2019/0007681 | A1* | 1/2019 | Tsai | H04N 19/186 |

FOREIGN PATENT DOCUMENTS

| CN | 103004195 A | 3/2013 |
| WO | 2003084242 A2 | 10/2003 |
| WO | 2011128303 A2 | 10/2011 |
| WO | 2017088170 A1 | 6/2017 |
| WO | WO 2017088810 A1 | 6/2017 |

OTHER PUBLICATIONS

Chen et al., "Algorithm Description of Joint Exploration Test Model 7 (JEM7)", Joint Video Exploration Team (JVET) of ITU-T SG 16 WP 3 and ISO/IEC JTC 1/SC 29/WG 11, Document JVET-G1001-v1, 7th Meeting, Torino, Italy, Jul. 13, 2017, 48 pages.

Sze et al., "High Throughput CABAC Entropy Coding in HEVC", IEEE Transactions on Circuits and Systems for Video Technology, vol. 22, No. 12, Dec. 2012, pp. 1778-1791.

Rui, Li, "Research on Some Key Techniques of Context-Aware Computing", XiangTan Polytechnic University, English language Abstract at pp. 7-8, Mar. 2007, 127 pages.

* cited by examiner

METHOD AND APPARATUS FOR VIDEO ENCODING AND DECODING BASED ON CONTEXT SWITCHING

CROSS REFERENCE TO RELATED APPLICATIONS

This application is the national stage entry under 35 U.S.C. § 371 of International Application PCT/US2018/065156, filed Dec. 12, 2018, which was published in accordance with PCT Article 21(2) on Jun. 27, 2019, in English, and which claims the benefit of European Patent Application No. EP17306896.6, filed Dec. 22, 2017.

TECHNICAL FIELD

The present embodiments generally relate to video encoding and decoding, particularly, entropy encoding and decoding based on context model switching.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

To achieve high compression efficiency, image and video coding schemes usually employ prediction and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized and entropy coded. To reconstruct the video, the compressed data is decoded by inverse processes corresponding to the prediction, transform, quantization and entropy coding.

In the High Efficiency Video Coding (HEVC) standard ("ITU-T H.265 Telecommunication standardization sector of ITU (October 2014), series H: audiovisual and multimedia systems, infrastructure of audiovisual services—coding of moving video, High efficiency video coding, Recommendation ITU-T H.265"), a picture is partitioned into coding tree units (CTU) of square shape with a configurable size typically 64×64, 128×128, or 256×256. As illustrated in FIG. 1, a CTU 110 is the root of a quad-tree partitioning into leaves called Coding Units (CU). For each CU, a prediction mode is signaled which indicates whether the CU is coded using intra or inter prediction. As illustrated in FIG. 2, a consecutive set of CTUs (e.g., CTU 220) may be grouped into a slice 210. A CU (e.g., CU 230) may be partitioned into one or more Prediction Units (PU) and forms the root of a quad-tree (known as transform tree) partitioning into Transform Units (TUs). Asymmetric subdivision of the CU into PUs is also possible in inter prediction, that is if a CU has a size N×N, a PU may have a size N/4×N, 3N/4×N, N×N/4, N×3N/4. Each PU is assigned some prediction information, for instance motion information, spatial intra prediction, etc.

The Quad-Tree plus Binary-Tree (QTBT) coding tool is a new video coding tool that provides a more flexible CTU representation and increased compression efficiency compared to the CU/PU/TU arrangement of the HEVC standard. As illustrated in FIG. 3, the Quad-Tree plus Binary-Tree (QTBT) coding tool defines a coding tree 310 where coding units can be split both in a quad-tree and in a binary-tree fashion. An exemplary coding tree representation of a Coding Tree Unit 320 is illustrated in FIG. 3, where solid lines indicate quad-tree partitioning and dotted lines indicate binary partitioning of a CU 330 within CTU 320, which is spatially embedded in the quad-tree leaves.

The splitting of a CTU into coding units is decided on the encoder side, e.g. through a rate distortion optimization procedure which consists in determining the QTBT representation of the CTU with minimal rate distortion cost. In the QTBT representation, a CU has either a square or a rectangular shape. The size of a coding unit is always a power of 2, and typically goes from 4 to 128. The QTBT decomposition of a CTU comprises two stages: the CTU is first split into 4 CUs in a quad-tree fashion, then each quad-tree leaf can be further divided into two CUs in a binary fashion or into 4 CUs in a quad-tree fashion, as illustrated in FIG. 3.

With the QTBT representation, a CU may not be further partitioned into PUs or TUs. In other words, each CU is considered as a single prediction unit and a single transform unit. However, such a QTBT representation only allows for symmetric splitting of a CU as illustrated by FIG. 3. The four split modes allowed by QTBT are: NO SPLIT (the CU is not split), QT SPLIT (split into 4 quadrants), HOR (split horizontally into two CUs of equal size) and VER (split vertically into two CUs of equal size).

Recently, CUs with new rectangular shapes were proposed which result from a new Binary Splitting Mode called asymmetric splitting mode, as illustrated in FIGS. 4 and 5. FIG. 4 illustrates a CU binary splitting mode in QTBT called asymmetric splitting mode and depicts 4 exemplary split modes 410 to 440. In FIG. 4, the new rectangular shapes include sizes equal to $3 \cdot 2^n$ in width and/or height. Moreover, a CU with a size multiple of 3 in width or height can be further split in a binary fashion, horizontally or vertically.

A square CU with size (w, h) (width and height) that is split through one of the proposed asymmetric binary splitting modes, for example HOR UP (horizontal-up) 410, results into 2 sub-coding units with respective rectangular sizes $$\left(w, \frac{h}{4}\right) \text{ and } \left(w, \frac{3h}{4}\right).$$

Therefore, a CU with width or height equal to $3 \cdot 2^n$ may be selected by the encoder. In such a case, an Intra prediction or Inter prediction process of a rectangular block with size multiple of 3 is performed. Additionally, a 2D transform with size $3 \cdot 2^n$ in width or height, and the subsequent transform coefficient entropy coding process are performed.

Other CU splitting modes, as illustrated in FIG. 5, called the horizontal 510 and vertical 520 triple tree splitting modes, consist in dividing a CU into 3 sub-coding-units (sub-CUs), with respective sizes equal ¼, ½ and ¼ of the parent CU size in the direction of the considered spatial division.

SUMMARY

According to an aspect of the present disclosure, a method of video encoding is provided including accessing a bin of a syntax element associated with a block in a picture of a video, determining a context for the bin of the syntax element from a set of contexts associated with a block type of the block, the set of contexts including at least a first context and a second context, the second context being associated with a larger number of block types than the first context and entropy encoding the bin of the syntax element based on the determined context.

According to an aspect of the present disclosure, an apparatus for video encoding is provided, the apparatus including means for accessing a bin of a syntax element associated with a block in a picture of a video, means for determining a context for the bin of the syntax element from a set of contexts associated with a block type of the block, the set of contexts including at least a first context and a second context, the second context being associated with a larger number of block types than the first context and means for entropy encoding the bin of the syntax element based on the determined context.

According to an aspect of the present disclosure, an apparatus for video encoding is provided, the apparatus including a processor, and at least one memory coupled to the processor, the processor being configured to access a bin of a syntax element associated with a block in a picture of a video, determine a context for the bin of the syntax element from a set of contexts associated with a block type of the block, the set of contexts including at least a first context and a second context, the second context being associated with a larger number of block types than the first context and entropy encode the bin of the syntax element based on the determined context.

According to an aspect of the present disclosure, a bitstream formatted to include encoded data representative of a block of a picture, the encoded data encoded by accessing a bin of a syntax element associated with a block in a picture of a video, determining a context for the bin of the syntax element from a set of contexts associated with a block type of the block, the set of contexts including at least a first context and a second context, the second context being associated with a larger number of block types than the first context and entropy encoding the bin of the syntax element based on the determined context.

According to an aspect of the present disclosure, a signal including a bitstream formatted to include encoded data representative of a block of a picture, the encoded data encoded by accessing a bin of a syntax element associated with a block in a picture of a video, determining a context for the bin of the syntax element from a set of contexts associated with a block type of the block, the set of contexts including at least a first context and a second context, the second context being associated with a larger number of block types than the first context and entropy encoding the bin of the syntax element based on the determined context.

According to an aspect of the present disclosure, a method of video decoding is provided including accessing an encoded bin of a syntax element associated with a block in a picture of an encoded video, determining a context for the bin of the syntax element from a set of contexts associated with a block type of the block, the set of contexts including at least a first context and a second context, the second context being associated with a larger number of block types than the first context and entropy decoding the encoded bin of the syntax element based on the determined context.

According to an aspect of the present disclosure, an apparatus for video decoding is provided, the apparatus including means for accessing an encoded bin of a syntax element associated with a block in a picture of an encoded video, means for determining a context for the bin of the syntax element from a set of contexts associated with a block type of the block, the set of contexts including at least a first context and a second context, the second context being associated with a larger number of block types than the first context and means for entropy decoding the encoded bin of syntax element based on the determined context.

According to an aspect of the present disclosure, an apparatus for video decoding is provided, the apparatus including a processor, and at least one memory coupled to the processor, the processor being configured to access an encoded bin of a syntax element associated with a block in a picture of an encoded video, determine a context for the bin of the syntax element from a set of contexts associated with a block type of the block, the set of contexts including at least a first context and a second context, the second context being associated with a larger number of block types than the first context and entropy decode the encoded bin of the syntax element based on the determined context.

According to an aspect of the present disclosure, a computer-readable program product is provided including program code instructions for accessing a bin of a syntax element associated with a block in a picture of a video, determining a context for the bin of the syntax element from a set of contexts associated with a block type of the block, the set of contexts including at least a first context and a second context, the second context being associated with a larger number of block types than the first context and entropy encoding the bin of the syntax element based on the determined context.

According to an aspect of the present disclosure, a computer-readable program product is provided including program code instructions for accessing an encoded bin of a syntax element associated with a block in a picture of an encoded video, determining a context for the bin of the syntax element from a set of contexts associated with a block type of the block, the set of contexts including at least a first context and a second context, the second context being associated with a larger number of block types than the first context and entropy decoding the encoded bin of the syntax element based on the determined context.

According to an aspect of the present disclosure, a computer-readable storage medium carrying a software program is provided including program code instructions for accessing a bin of a syntax element associated with a block in a picture of a video, determining a context for the bin of the syntax element from a set of contexts associated with a block type of the block, the set of contexts including at least a first context and a second context, the second context being associated with a larger number of block types than the first context and entropy encoding the bin of the syntax element based on the determined context.

According to an aspect of the present disclosure, a computer-readable storage medium carrying a software program is provided including program code instructions for accessing an encoded bin of a syntax element associated with a block in a picture of an encoded video, determining a context for the bin of the syntax element from a set of contexts associated with a block type of the block, the set of contexts including at least a first context and a second context, the second context being associated with a larger number of block types than the first context and entropy decoding the encoded bin of the syntax element based on the determined context.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
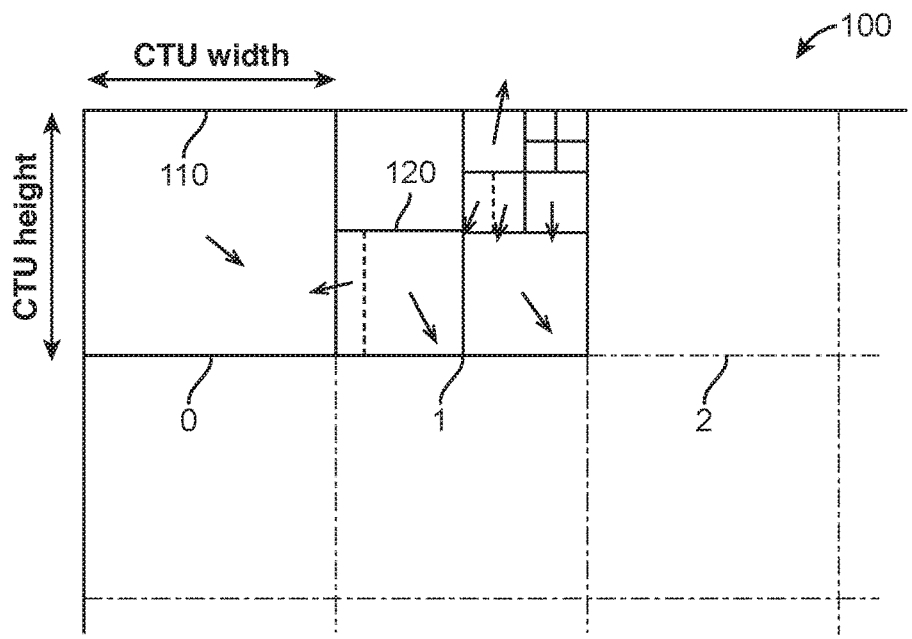
FIG. 1 illustrates a CTU split into CUs in accordance with the HEVC standard.
Figure 2:
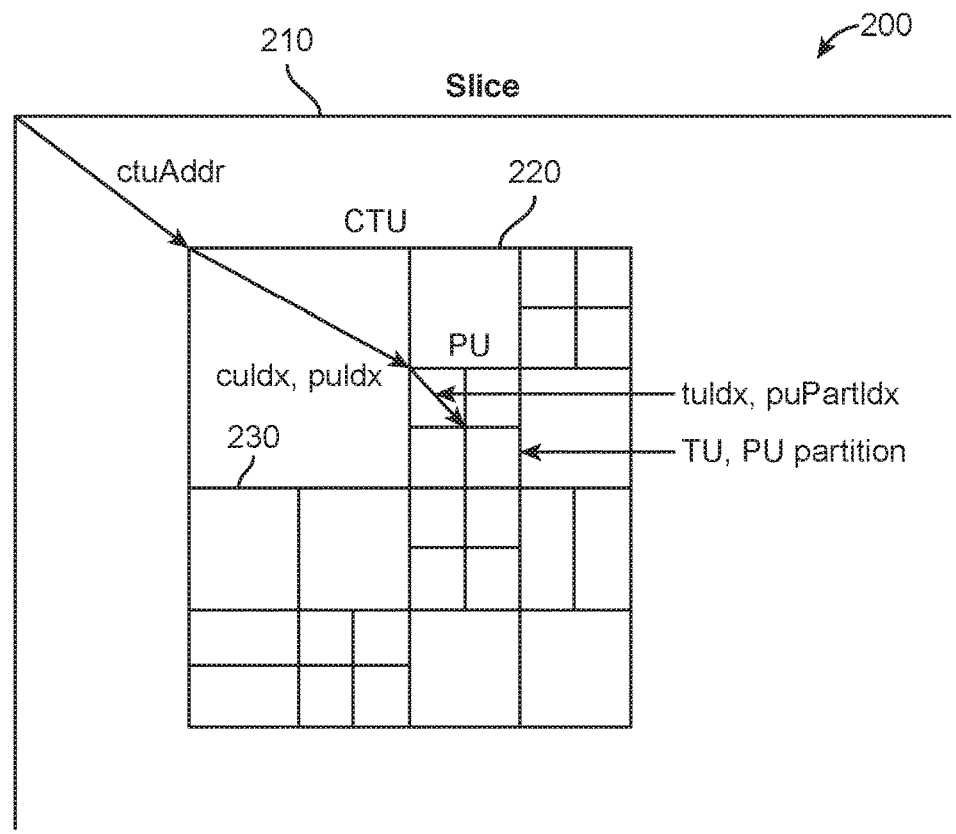
FIG. 2 illustrates the splitting of a CTU into CUs, PUs and TUs in accordance with the HEVC standard.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function.

The disclosure as defined by such claims resides in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present disclosure, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

It is to be understood that a picture is an array of Luma samples in monochrome format, or an array of Luma samples and two corresponding arrays of Chroma samples in 4:2:0, 4:2:2, and 4:4:4 color format. In HEVC, a "block" addresses a specific area in a sample array (e.g., Luma Y), and a "unit" includes the collocated block of all encoded color components (Luma Y and possibly Chroma Cb and Chroma Cr), syntax elements and prediction data that are associated with the block (e.g., motion vectors). However, the term "block" is more generally used herein to refer to a block (e.g. a coding block (CB), transform block (TB), coding group (CG), etc.) or a unit (e.g. a CU).

It is to be understood that a picture or block of pixels or transform coefficients is a two-dimensional array or matrix. The horizontal or x direction (or axis) represents a width and the vertical or y direction (or axis) represents a height. The indexes start at 0. The x direction represents columns and the y direction represents rows. The maximum x index is the width—1. The maximum y index is the height—1.

In the following sections, the words "reconstructed" and "decoded" may be used interchangeably. Usually but not necessarily "reconstructed" is used on the encoder side while "decoded" is used on the decoder side. Also, the words "coded" and "encoded" may be used interchangeably. Moreover, the words "image", "picture" and "frame" may be used interchangeably. Furthermore, the words "coding", "source coding" and "compression" may be used interchangeably.

Figure 3:
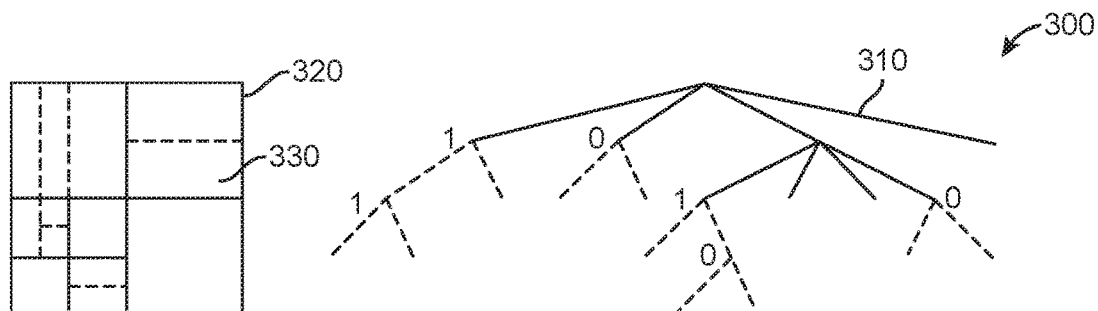
FIG. 3 illustrates a CTU in accordance with the QTBT tool.
Figure 4:
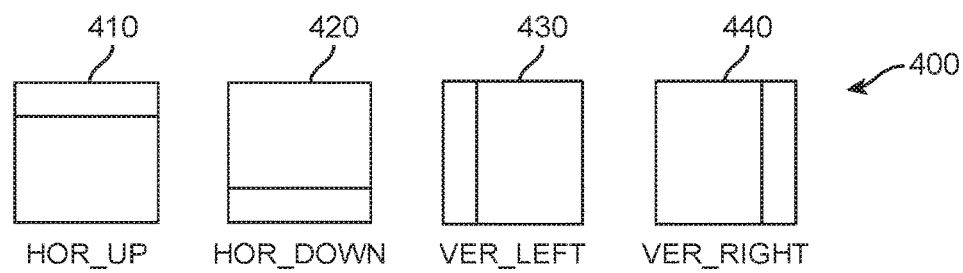
FIG. 4 illustrates a CU binary splitting mode in QTBT called asymmetric splitting mode.
Figure 5:
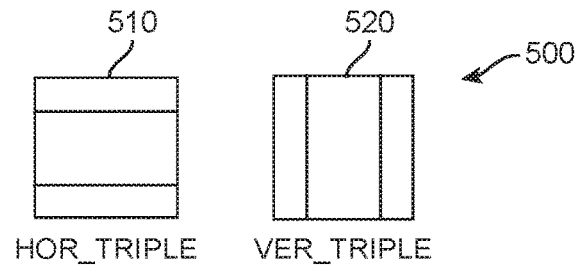
FIG. 5 illustrates the horizontal (left) and vertical (right) triple tree CU splitting modes in QTBT.
Figure 6:
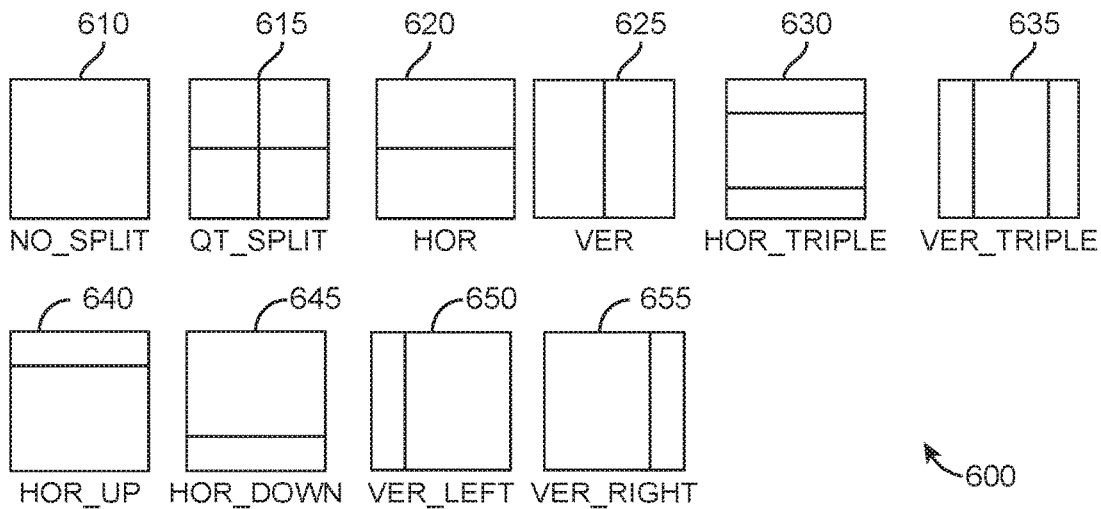
FIG. 6 illustrates an exemplary set of CU splitting modes in accordance with an embodiment of the present disclosure.

The present disclosure is directed to techniques for video or image encoding and decoding (also known as source coding and decoding) where blocks of a plurality of shapes and splitting modes (e.g., all or a subset of the CU splitting modes illustrated in FIGS. 3, 4 and 5) may be allowed in the video coding, that is, the encoder may choose any of these shapes and splitting modes and signal them to the decoder. FIG. 6 illustrates an exemplary set of CU splitting modes according to the present disclosure. The rich set of CU topologies result in coding structures that spatially match the structures and discontinuities contained in the images of a bitstream.

It is of interest to propose encoding strategies that take into consideration the different shapes of the coding and sub-coding units. The present disclosure is directed to entropy coding of transform coefficients for the various CU splitting modes in order to provide increased compression efficiency (or rate distortion performance) with a small increase in complexity. In particular, multiple contexts per bin and context switching are provided for entropy encoding syntax elements.

Encoding

Figure 7:
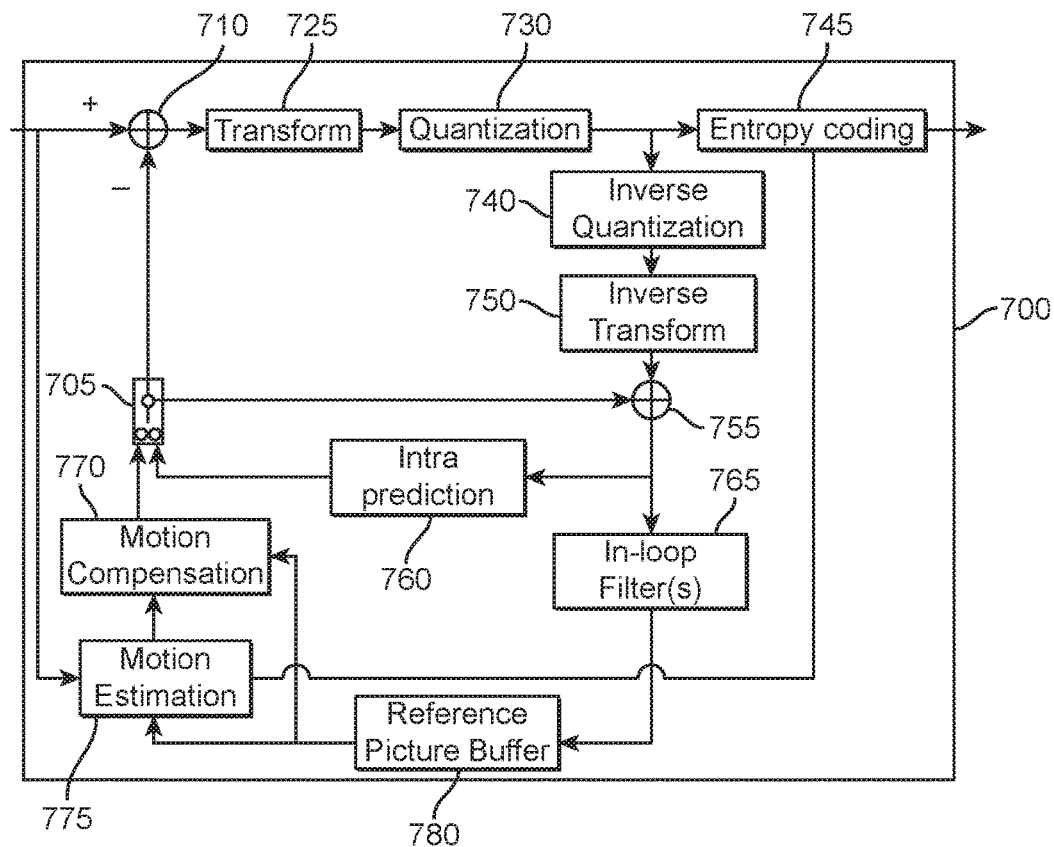
FIG. 7 illustrates a simplified block diagram of an exemplary video encoder in accordance with an embodiment of the present disclosure.

FIG. 7 illustrates a simplified block diagram of exemplary video encoder 700 in accordance with an embodiment of the present disclosure. The encoder 700 may be included in a transmitter or headend in a communication system. To encode a video sequence with one or more pictures, a picture may be partitioned into CTUs of square shape with a configurable size. A consecutive set of CTUs may be grouped into a slice. A CTU is the root of a QTBT partitioning into CUs. In the exemplary encoder 700, a picture is encoded by the encoder modules as described below. Each block is encoded using either an intra mode or inter mode. When a block is encoded in an intra mode, the encoder 700 performs intra prediction (module 760). In an inter mode, motion estimation (module 775) and compensation (module 770) are performed. The encoder decides (module 705) which one of the intra mode or inter mode to use for encoding the block, and indicates the intra/inter decision by a prediction mode flag. Residuals are calculated by subtracting (module 710) a predicted sample block (also known as a predictor) from the original image block.

As an example, blocks in intra mode are predicted from reconstructed neighboring samples. Inter prediction is performed by performing motion estimation (module 775) and motion-compensating (in module 770) a reference block stored in a reference picture buffer 780. The motion estimation module 775 may include motion compensation since its purpose is to determine the best motion vectors which may use an iterative search that typically terminates when the rate-distortion cost (RD cost) is low enough, or has reached a minimum.

The residuals are transformed (module 725) and quantized (module 730). The transform module 725 may transform the image from the pixel or time domain to the transform or frequency domain. The transform may be may be, e.g., a cosine transform, a sine transform, a wavelet transform, etc. Quantization may be performed according to, e.g., a rate distortion criterion. The quantized transform coefficients, as well as motion vectors and other syntax elements, are entropy coded (module 745) to output a bitstream. The entropy coding may be, e.g., Context Adaptive Binary Arithmetic Coding (CABAC), Context Adaptive Variable Length Coding (CAVLC), Huffman, arithmetic, exp-Golomb, etc. The encoder may also skip the transform and apply quantization directly to the non-transformed residual signal. The encoder may also bypass both transform and quantization, i.e., the residual is coded directly without the application of the transform or quantization process. In direct PCM coding, no prediction is applied, and the block samples are directly coded into the bitstream.

The encoder comprises a decoding loop and thus decodes an encoded block to provide a reference for further predictions. The quantized transform coefficients are de-quantized (module 740) and inverse transformed (module 750) to decode residuals. An image block is reconstructed by combining (module 755) the decoded residuals and the predicted sample block. An in-loop filter (765) may be applied to the reconstructed picture, for example, to perform deblocking/Sample Adaptive Offset (SAO) filtering to reduce coding artifacts. The filtered image is stored in the reference picture buffer 780.

The modules of video encoder 700 may be implemented in software and executed by a processor, or may be implemented by well-known circuits by one skilled in the art of compression. In particular video encoder 700 may be implemented as an integrated circuit (IC).

The modules of video encoder 700 may also be present in other video encoders (e.g., HEVC encoders), except for the differences described in the present disclosure, particularly, differences in the block sizes and shapes, as in FIG. 6, and differences in the entropy coding module 745, as will be described in greater detail in the following paragraphs and figures. For functionalities other than entropy encoding (e.g., modules other than 745), video encoder 700 may be similar to an HEVC video decoder and the functionalities are not herein described in detail.

Entropy Encoding

Figure 8:
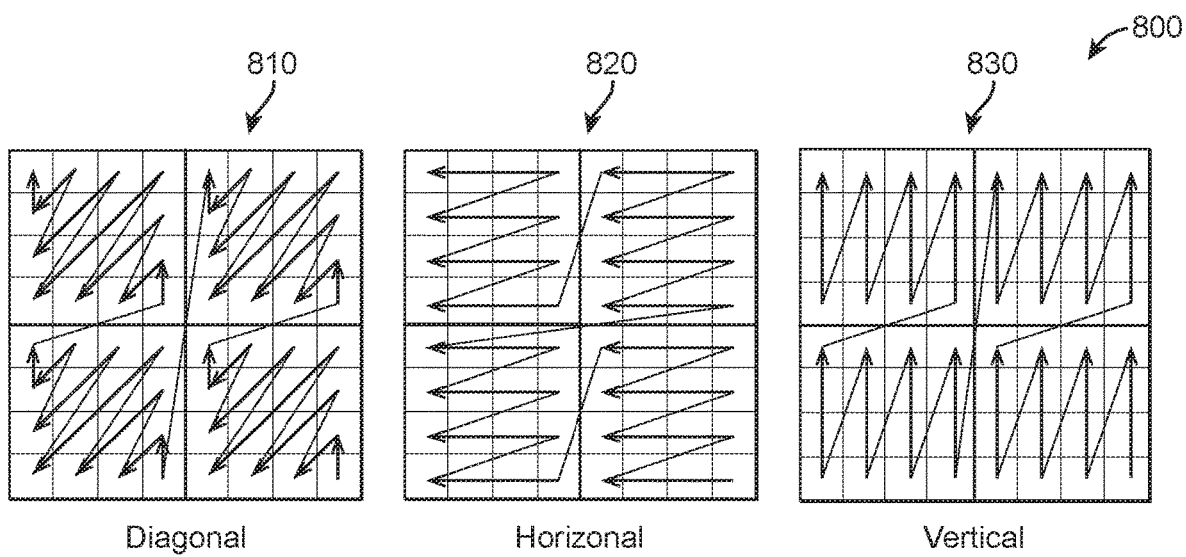
FIG. 8 illustrates the scanning order of transform blocks in accordance with the HEVC standard and an embodiment of the present disclosure.

In the HEVC standard and in the document JVET-C1001_v3 of the Joint Video Exploration Team of ISO/IEC JTC1/SC29/WG11, quantized coefficients contained in a so-called transform-block (TB) may be entropy coded and decoded using CABAC according to the exemplary patterns in FIG. 8, which illustrates an exemplary 8×8 TB.

A TB may be a rectangular block of samples on which the same transform is applied. A TB results from the optional partitioning of a Coding Block (CB). A CB may be a rectangular set of samples contained in a same color component. In case a CB is not partitioned, then the TB and CB have same size and spatially coincide. A CU may be made of one CB of Luma samples, and two CBs of Chroma samples (in the case of a color picture with three color components).

CABAC is based on arithmetic coding and has been adopted by the HEVC standard. CABAC may use multiple probability models for different contexts. It first converts all non-binary symbols to binary. In particular, syntax elements are binarized (i.e. represented as a sequence of binary symbols called bins, each equal to a '0' or '1'). Then, for each bin, the encoder selects which probability model to use (identifying the probability of a bin being a '0' or a '1'), and utilizes information from nearby elements (or context) to optimize the probability estimate.

Figure 9:
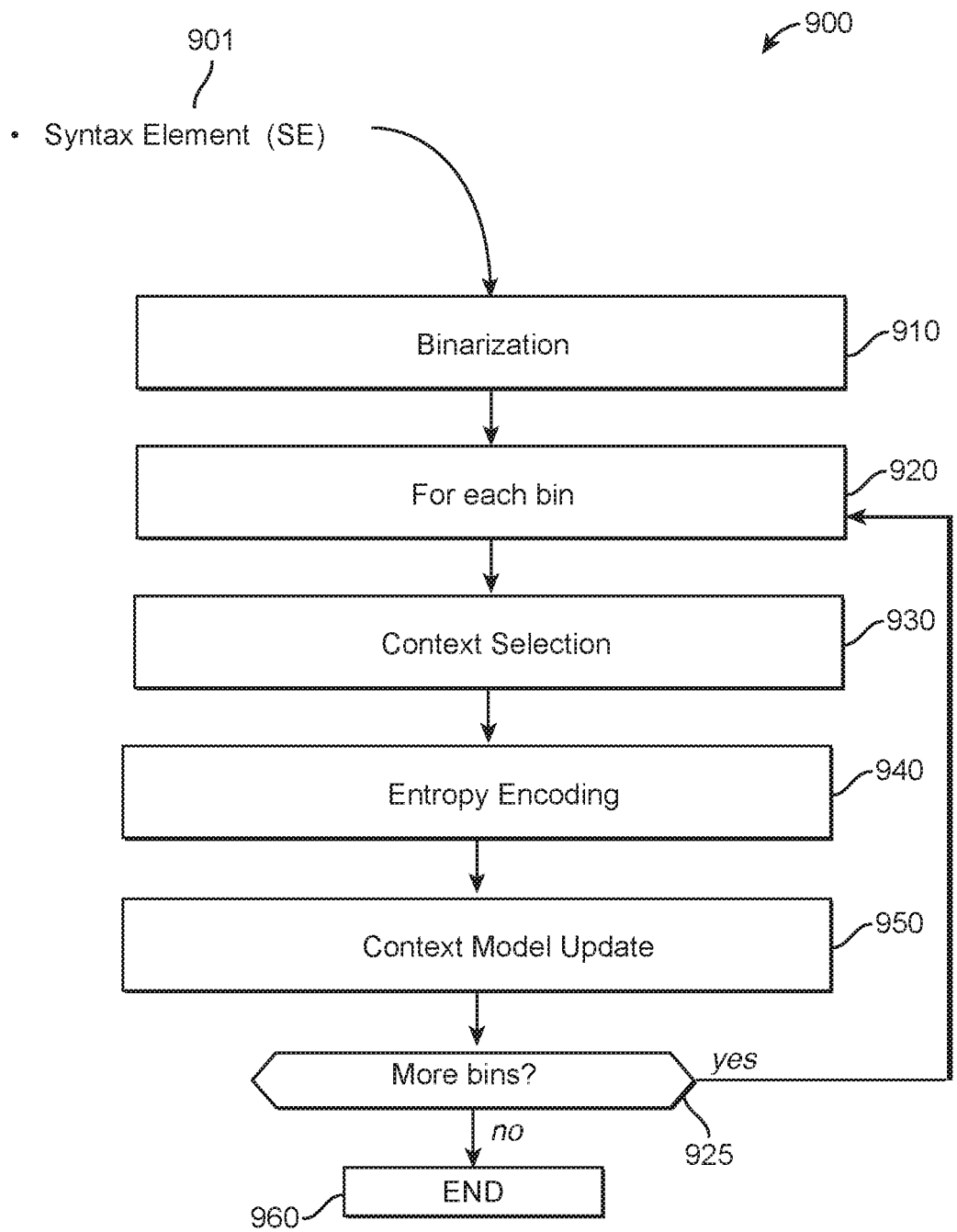
FIG. 9 illustrates a flowchart of an exemplary method of context-based entropy coding in accordance with the prior art.

FIG. 9 illustrates a flowchart 900 of an exemplary method of context-based entropy coding (e.g., CABAC) in accordance with the prior art. At step 910, the syntax element (SE) 901, when not already a binary value (such as a binary flag), is first binarized. Then, within loop 920, for each bin:

a. At step 930, a context CTX is selected based on contextual information of the syntax element or bin to code. The context CTX is associated to a context model that stores the contextual probability of the bin being "1" or "0". The contextual probability corresponds to the estimated conditional probability that the bin takes the value "b" knowing the context value CTX, i.e., P(b/CTX). The selection is based on contextual information, such as already-coded symbols (syntax elements) in the neighborhood of the current symbol (syntax element) to encode, the CU/PU/TU size or shape, or the slice type;
  b. At step 940, the bin is encoded using an entropy encoder (e.g., arithmetic encoder) according to the contextual probability P(b/CTX);
  c. At step 950, once the bin is coded, the context model is updated, i.e., the contextual probabilities, P(0/CTX) and P(1/CTX), are updated. For example, the update may represent a count update of the number of occurrences of the bin value ("0" or "1"), and may also take in consideration the total number of bits.
  d. At step 925, check if there are more bins to encode. If yes, then return to step 920 (e.g., by moving to the next bin of the syntax element); otherwise, end the process at step 960.

Without loss of generality, steps 940 and 950 may be switched in order or be performed in parallel.

As an example, consider a syntax element SE corresponding to a positive integer value. The following steps may apply:

Binarization (e.g., 910): the positive integer value is converted to a bin string by unary coding as follows.
  SE=0 → bin string="0"
  SE=1 → bin string="10"
  SE=2 → bin string="110"
  . . .

Context selection (e.g., 930): the following contexts models are defined for the different bins of the bin string
  Bin 0 → 3 contexts, 0, 1, 2, depending on the values of the previously coded SE, $SE_{PREV}$
    If (0<=$SE_{PREV}$<3) → model 0
    If (3<=$SE_{PREV}$<33) → model 1
    If (33<=$SE_{PREV}$) → model 2
  Other bins → model 3

An HEVC CABAC encoder (step 950) has two main modes: regular coding and bypass coding. The bypass coding mode may be chosen for bins related to sign information or for lower significant bins, which are assumed to be uniformly distributed and for which, consequently, the regular binary arithmetic encoding process is bypassed. The regular coding mode, each bin value is encoded by using the regular arithmetic encoding process, where the associated probability model is either determined by a fixed choice, without any context modeling, or adaptively chosen depending on the related context model.

For context-based coding, a conditional probability model is used to skew the distribution of the data. Instead of estimating these probabilities ahead of time, the probabilities are estimated as the coding proceeds. Arithmetic coding is finally applied to compress the data. A proper choice of the context, hence the probability model for each bit allows for an increased compression efficiency. The context models may be indexed and identified by the context index. CABAC and other context-based encoders and decoders are well-known by those skilled in the art of compression and are not herein described in detail.

The present disclosure applies to general context-based entropy encoders (e.g., CABAC encoders) and relates to determining the context (e.g., context index) used for the entropy compression of elements (e.g., syntax elements or syntax element bins) as a function of the shape of a TB, which may provide more compression efficiency, particularly, when the CUs are asymmetric. In particular the present disclosure is directed to context switching, among multiple contexts applied to encode the bins of a given syntax element as will be described in greater detail in the following paragraphs and figures.

The TB in FIG. 8 is divided into 4×4 sub-blocks of quantized coefficients called Coding Groups (CG). The entropy coding/decoding is made of several scanning passes, which scan the TB according to a scan pattern selected among several possible scan patterns, e.g., diagonal 810, horizontal 820 and vertical 830.

Transform coefficient coding may involve five main steps: scanning, last significant coefficient coding, significance map coding, coefficient level coding and sign data coding. The five main steps correspond to the different types of processing used to encode the samples of a transform block.

Scanning corresponds to a loop over the CG according to a given CG scanning order, and a loop on coefficients inside each CG according to a coefficient scanning order. The last significant coefficient position is the position (X,Y) of the last non-zero transform coefficient in the TB.

The significance map is the coded information that allows the decoder to identify the position of non-zero coefficients in the TB. The information includes the significance or significant flag of a CG (e.g., a 4×4 subset of transform coefficients) and the significance of transform coefficients in the CG. The CG significant flag indicates if a CG contains at least one significant coefficient or not. If the CG significant flag is equal to zero, then it implies that there are no significant coefficients contained in this CG, and the significant coefficient flags are not signaled for the coefficients contained in this CG; otherwise they are signaled (coded). Significance map coding then stands for the coding of all the information that is related to the significance of the CG and the significance of the coefficients, which includes the two syntax elements previously mentioned: the significant coding group flag and the significant coefficient flag. Coefficient level coding corresponds to coding the magnitude of the transform coefficient. Sign data coding corresponds to coding the sign of a transform coefficient.

For inter blocks, the diagonal scanning on the left of FIG. 8 may be used, while for 4×4 and 8×8 intra block, the scanning order may depend on the Intra Prediction mode active for that block.

A scan pass over a TB then consists in processing each CG sequentially according to one of the scanning orders (diagonal, horizontal, vertical), and the 16 coefficients inside each CG are scanned according to the considered scanning order as well. A scanning pass starts at the last significant coefficient in the TB, and processes all coefficients until the DC coefficient (top left coefficient in the TBs of FIG. 8).

The entropy coding of transform coefficients comprises up to five scan passes, respectively dedicated to the coding of each syntax element in the following list:
Significant coefficient flag (significant-coeff-flag): significance of a coefficient (zero/non-zero).
Coefficient absolute level greater than one flag (coeff-abs-level-greater1-flag): indicates if the absolute value of a coefficient level is greater than 1
Coefficient absolute level greater than two flag (coeff-abs-level-greater2-flag): indicates if the absolute value of a coefficient level is greater than 2
Coefficient sign flag (coeff-sign-flag): sign of a significant coefficient (0: positive, 1: negative)
Coefficient absolute level remaining (coeff-abs-level-remaining): remaining value for absolute value of a coefficient level (if value is larger than that coded in previous passes). The magnitude of a transform coefficient to code/decode is always a positive integer value. The coeff-abs-level-remaining corresponds to the absolute value of the coefficient minus 3 (if it is known the coefficient is greater than 2). Moreover, at most 8 coeff-abs-level-greater2-flags may be coded in a given CG. Therefore, when the coeff-abs-level-greater2-flag is not signaled, then the decoder only knows if the coefficient is greater than 1. In this case, the coeff-abs-level-remaining corresponds to the absolute value of the coefficient minus 2 (if it is known the coefficient is greater than 1).

Once the absolute value of a transform coefficient is known by the decoder by decoding a subset of the four first passes above, then no further syntax elements are coded in the remaining passes for that coefficient, with regards to its absolute value. The same is performed for the sign coding: the coeff-sign-flag is sent only for non-zero coefficients.

All scan passes are performed/coded for a given CG until all the quantized coefficients in that CG can be reconstructed, before going to next CG. The overall decoding TB parsing process is made of the following main steps:

1. Decode the Last Significant Coordinate, which includes the following syntax elements: last significant coefficient prefix in the x direction or axis (last_sig_coeff_x_prefix), last significant coefficient prefix in the y direction (last_sig_coeff_y_prefix), last significant coefficient suffix in the x direction (last_sig_coeff_x_suffix), and last significant coefficient suffix in the y direction (last_sig_coeff_y_suffix), which provides the decoder with the spatial position (x- and y-coordinates) of the last non-zero coefficients in the whole TB. The y direction or axis may be the vertical direction and the x direction or axis may be the horizontal direction. The opposite may also hold true.

Then for each successive CG from the CG containing the last significant coefficient in the TB to the top-left CG in the TB, the following steps apply.

2. Decode the CG significance flag, which is called coded sub-block flag (coded_sub_block_flag) in the HEVC specification.
3. Decode the significant coefficient flag for each coefficient in the considered CG, which corresponds to the syntax element sig_coeff_flag in the HEVC standard, indicating which coefficient is non-zero in the CG.

Next, the parsing stages aim at parsing and signaling the coefficient level, for coefficients known as non-zero in the considered CG, which involve the following syntax elements.

4. Decode coeff_abs_level_greater1_flag, which indicates if a current coefficient absolute value is greater than 1 or not. If not, the absolute value if equal to 1.
5. Decode coeff_abs_level_greater2_flag, which indicates if a current coefficient absolute value is greater than 2 or not. If not, the absolute value if equal to 2.
6. Decode coeff_sign_flag, which indicates the sign of the non-zero coefficients.
7. Decode coeff_abs_level_remaining, which encodes the absolute value of the coefficient higher than 2 in absolute value.

According to an embodiment of the present disclosure, video encoder 700 generally follows the method of entropy encoding described above, with modifications in the encoding (and corresponding decoding) of the last significant coefficient coordinates, and/or the encoding (and corresponding decoding) of the significant coefficient flag. The modifications will be described in greater detail in the following paragraphs and figures.

Figure 10:
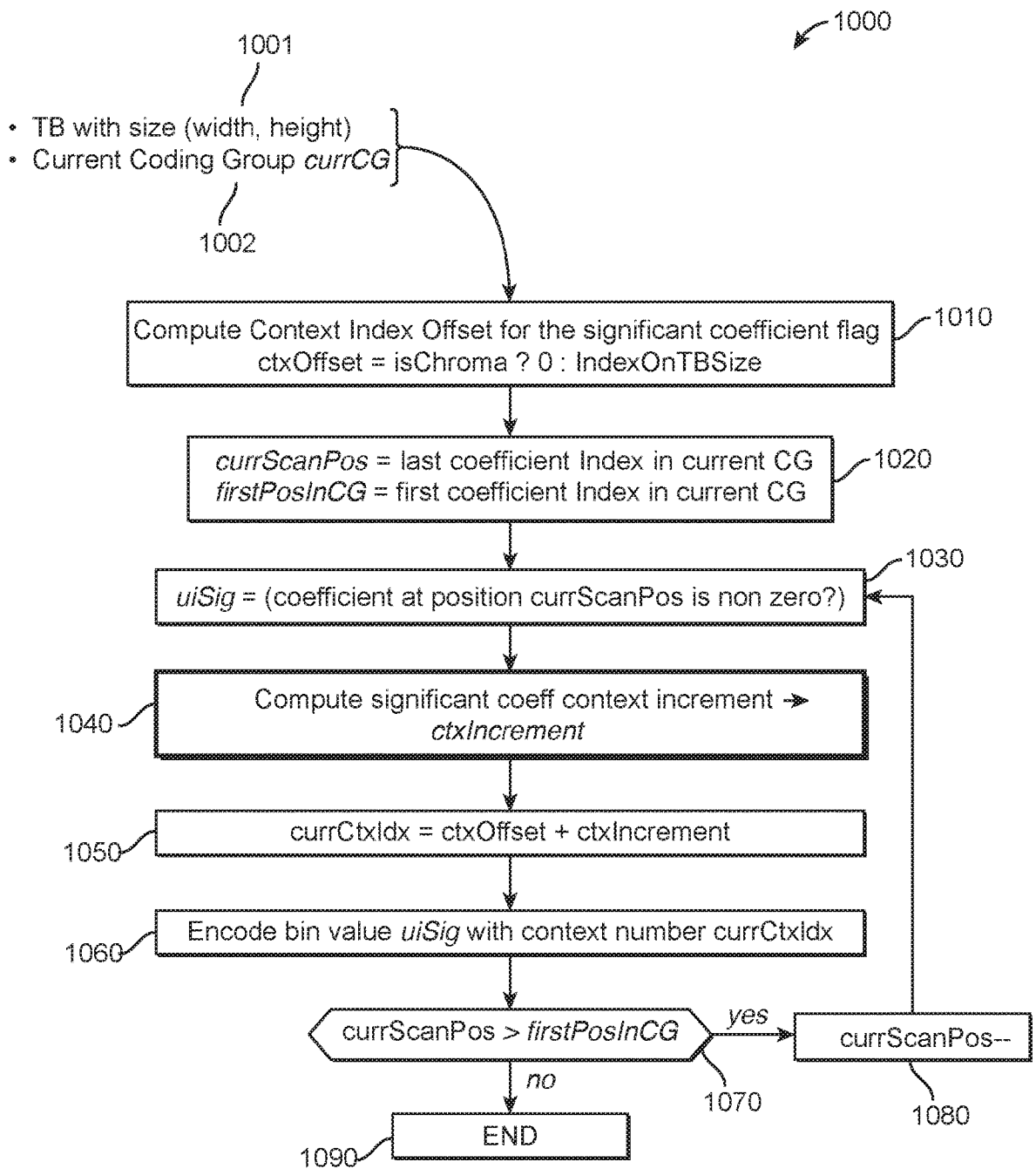
FIG. 10 illustrates a flowchart of an exemplary method of entropy encoding a significant coefficient flag in accordance with the prior art.

FIG. 10 illustrates a flowchart 1000 of an exemplary method of entropy encoding the significant coefficient flag in accordance with the prior art. The method 1000 is similar to the one described in document JVET-C1001_v3 of the Joint Video Exploration Team of ISO/IEC JTC1/SC29/WG11.

The inputs to the process are the TB 1001 to encode, with size (width, height), and the current CG (currCG) 1002 in the considered TB. The two first steps 1010, 1020 of the process aim at initializing the computation of the index of the base context index used to encode the significant coefficient flag. In step 1010, ctxOffset is equal to 0 if the TB is of Chroma component, and is equal to IndexOnTBSize if the TB is not Chroma (i.e., Luma). As shown in FIG. 10, the computation depends on the TB size, more precisely, on the TB area. Indeed, the following value is calculated and associated with IndexOnTBSize:

$$ui\ \text{Log 2BlkSize} = \lfloor (\log 2(\text{width}) + \log 2(\text{height}))/2 \rfloor \quad (1)$$

where $\lfloor . \rfloor$ is a round-down operator.

If the current TB is in the Luma component, then the set of contexts that are used to code the significant coefficient flag are set as a function of this value ui Log 2BlkSize. As a result, separated sets of contexts (e.g., CABAC contexts) are employed to code the significant coefficient flag of TB with different areas for Luma components. These different sets of contexts are represented by the context offset (ctxOffset), which is an address in a global set of contexts useful for the coding of the significant coefficient flag.

Step 1020 initializes the current scan position (currScanPos) and the first position in the current CG (firstPosInCG), that is, the last coefficient index and the first coefficient index in the current CG, respectively, since the scan proceeds from last to first coefficient in the current CG, as in FIG. 8.

Steps 1030-1080 of the coding process of FIG. 10 consist in a loop over each coefficient in the current CG of the current TB, from the last coefficient towards the lowest frequency coefficient. Step 1030 determines the significant coefficient flag or significance (also, sig_coeff_flag) as variable uiSig, which is 1 if the coefficient in the currScanPos is non-zero, and 0 otherwise. Then, step 1040 computes the significant coefficient flag context increment (ctxIncrement) as will be described in greater detail in the following paragraphs and figures, in particular, FIGS. 11-12.

For each coefficient, a context index (currCtxIdx) for the coding of its significance is computed at step 1050, as a function of the context offset (ctxOffset) and the context increment (ctxIncrement). The function may be an addition, as in step 1050, or another linear or nonlinear function. Once the context index for the current coefficient (defined by currScanPos) is obtained, its significance bin, represented by variable uiSig is entropy encoded (e.g., CABAC encoded) in step 1060 as a function of the context index. In step 1070, the process checks whether CurrScanPos greater than firstPosInCG. If the check in step 1070 is true, the process decrements CurrScanPos by 1 in step 1080 and returns to step 1030. If the check in step 1070 is false, the process ends in step 1090. The process is over once the loop reaches the coefficient with lowest frequency (or DC coefficient) in the current CG, that is, the top left coefficient in FIG. 8, represented by firstPosInCG.

In the following, step 1040 of computing or determining the significant coefficient content increment (ctxIncrement) will be described in detail, starting with the prior art method described in document JVET-C1001_v3 of the Joint Video Exploration Team of ISO/IEC JTC1/SC29/WG11 (FIG. 10).

Figure 11:
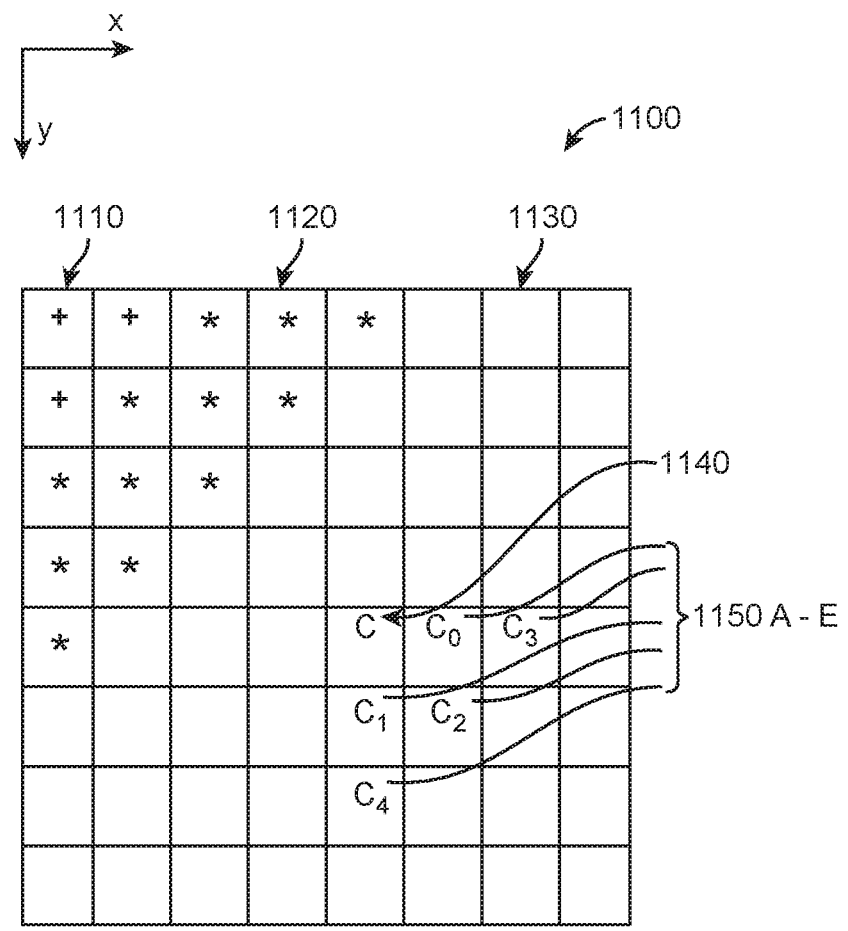
FIG. 11 illustrates an exemplary context template used for entropy coding syntax elements in accordance with the prior art.

The context increment computation in step 1040 of FIG. 10 depends on the values of the significant coefficient flag of previously coded coefficients in the neighborhood covered by a local template. More specifically, the context index is determined based on the sum of the significant coefficient flags of neighboring coefficients (each flag with a value of 0 or 1). The local template ($c_0, \ldots, c_4$) is depicted in FIG. 11 illustrating an exemplary 8×8 TB 1100. To capture the characteristics of transform coefficients at different frequencies, one TB is split into up to three context regions (1110, 1120 and 1130) and the splitting method is fixed regardless of the TB size, as illustrated in FIG. 11. The context model template 1100 includes the three context regions. The context increments assigned to each region are as follows: 12-17 for region 1110, 6-11 for region 1120 and 0-5 for region 1130.

The context increment associated with any given transform coefficient C 1140 in block 1100 is computed or determined as follows:
1. The number of significant coefficients 1150A-E in the set of neighboring coefficients ($c_0, \ldots, c_4$) is computed by:

$$\text{num}_{SIG} = \Sigma_{i=0}^{4} \text{sig}(c_i) \quad (2)$$

where $\text{sig}(c_i)$ is the significance or significant coefficient flag of coefficient $c_i$.

2. The index of the diagonal to which coefficient C belongs to is computed as the sum of its coordinates:

$$\text{diag} = \text{posX}(C) + \text{posY}(C) \quad (3)$$

where posX(C) and posY(C) are the respective positions of the coefficient according to the x and y axis.

3. Finally, the context increment for current coefficient C is computed as:

$$\text{ctxIncrement} = (\text{diag}<2?\ 6:\ 0) + (\text{diag}<5?\ 6:\ 0) + \text{num}_{SIG} \quad (4)$$

where diag is compared against threshold values 2 and 5, and values of 6 or 0 are assigned to the comparisons depending on whether or not diag is smaller than the respective threshold values.

Luma and Chroma components are treated in a similar way but with separate sets of contexts.

Figure 12:
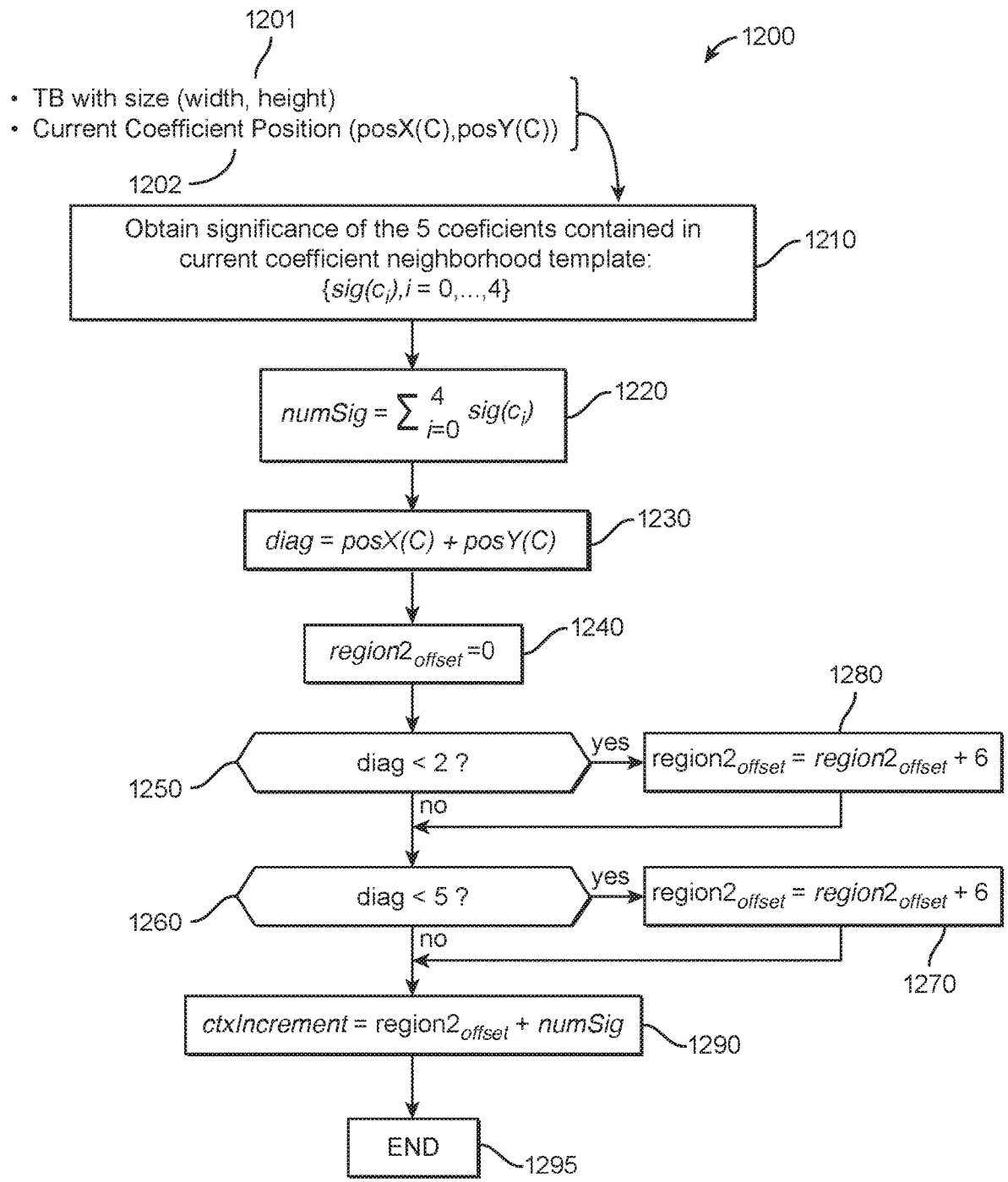
FIG. 12 illustrates a flowchart of an exemplary method of determining the significant coefficient context increment in accordance with the prior art.

FIG. 12 illustrates a flowchart 1200 of a method of determining the significant coefficient context increment for a current transform coefficient C in accordance with document JVET-C1001_v3 of the Joint Video Exploration Team of ISO/IEC JTC1/SC29/WG11, as explained in equations 2-4 above. In method 1200, the two diag variable comparisons are defined by the variable region2$_{offset}$, since region 2 (1120 in FIG. 11) is defined between the two threshold values (2 and 5). Steps 1210 and 1220 of FIG. 12 perform equation 2. Step 1230 performs equation 3. Steps 1240-1290 perform equation 4. The computation for a current coefficient C ends at step 1295.

The context template 1100 in FIG. 11 illustrates the three context regions used to assign CABAC contexts to each transform coefficient, when coding the significance flag of that coefficient, conforming to the significant coefficient flag coding described in FIG. 12. One may appreciate that the regions defined according to the prior art method of FIG. 12 are independent of the differences in width and height of the block. In fact, the three regions are more appropriate for square TBs.

From FIGS. 10 to 12, the context for coding the significant-coeff-flag may be computed as follows:
- An context index (numSig), derived from the values of the 5 neighboring coefficients already coded, takes its values from 0 to 4.
- A region offset index (region2$_{offset}$) derived from the position (x,y) in the block of the coefficient to code. Three regions in the block 1000 (1010, 1020, 1040) are defined (reg$_{idx}$=1 to 3), and region2$_{offset}$ takes its values among 0, 6, 12. In step 1290, numSig and region2$_{offset}$ define the context increment (ctxIncrement)
- A size offset index (ctxOffset), derived from the size of the block of the coefficient to code (log 2BlkSize), is computed as follows:

| | |
|---|---|
| ctxOffset = 0 | if log2BlkSize ≤ 2 |
| ctxOffset = 18 | if log2BlkSize = 3 |
| ctxOffset = 36 | if log2BlkSize ≥ 4 | which results in 54 contexts, as shown in Table 1. The context increment (ctxIncrement) is added to the value of ctxOffset, for deriving the context of a coefficient positioned at position (x,y) in a TB of size (width×height), according to the prior art.

TABLE 1

| log2BlkSize | Region index $reg_{idx}$ | numSig | ctxIncrement |
|---|---|---|---|
| ≤2 | 1 | 0-5 | 0-5 |
|  | 2 | 0-5 | 6-11 |
|  | 3 | 0-5 | 12-17 |
| =3 | 1 | 0-5 | 18-23 |
|  | 2 | 0-5 | 24-29 |
|  | 3 | 0-5 | 30-35 |
| ≥4 | 1 | 0-5 | 36-41 |
|  | 2 | 0-5 | 42-47 |
|  | 3 | 0-5 | 48-53 |

Variants of FIG. 12 (including variants of the function diag) taking the shape of the block in consideration have been recently proposed and may also be applied to the present disclosure.

It may be observed that the dependence on the block size includes several different block shapes, as shown below
  log 2BlkSize≤2 corresponds to blocks of size: 4×4, 4×8/8×4
  log 2BlkSize=3 corresponds to blocks of size: 4×16/16×4, 4×32/32×4, 8×8, 8×16/16×8
  log 2BlkSize≥4 corresponds to blocks of size: 8×32/32×8, 16×16, 16×32/32×16, 32×32

There is a balance between grouping many block shapes together, which speeds up the learning of the probabilities in the context models, versus decreasing the number of block shapes per group, therefore obtaining more specialized context groups at the expense of a slower speed for learning the probabilities in the context models.

According to the present disclosure, a variant may be proposed for handling differently square and rectangular blocks. For instance, one can define additional contexts for specific (non-square) block shapes, e.g., for blocks of size 4×16 and 8×32. This could result in the following exemplary contexts of Table 2, where the block shape or type is also taken into consideration (as specific/not specific shape).

TABLE 2

| log2BlkSize | Region index $reg_{idx}$ | numSig | ctxIncrement |
|---|---|---|---|
| ≤2 AND not specific shape | 1 | 0-5 | 0-5 |
|  | 2 | 0-5 | 6-11 |
|  | 3 | 0-5 | 12-17 |
| =3 AND not specific shape | 1 | 0-5 | 18-23 |
|  | 2 | 0-5 | 24-29 |
|  | 3 | 0-5 | 30-35 |
| ≥4 AND not specific shape | 1 | 0-5 | 36-41 |
|  | 2 | 0-5 | 42-47 |
|  | 3 | 0-5 | 48-53 |
| specific shape | 1 | 0-5 | 54-59 |
|  | 2 | 0-5 | 60-65 |
|  | 3 | 0-5 | 66-71 |

In FIGS. 10-12, Tables 1 and 2, the coding/decoding of the significant coefficient flag depends on the size and/or shape of the TB. As for any other syntax element to be coded, one context per bin (or for several bins) is used.

Recently, a multi-parameter probability update for the CABAC entropy coding has been proposed. In the original CABAC, one single probability model was associated to each context. The recent proposal uses two probability models, one converging faster than the other. Each time the context is selected, the models are updated. In encoding the bin which uses the context, only one of the probability models is used. When there are still few occurrences or selections of the context, the fast-converging probability model is used. As soon as there are enough occurrences of the context, the low-converging probability model is used. The low-converging model provides a more accurate estimation of the probabilities for a larger number of samples. Hence, there is a switch between two probability models based on the number of occurrences of the context. A level or threshold on the number of occurrences or selections may be established to trigger the switch.

A simplified version of the multi-probability CABAC updates the two models together, and the final probability value is the average of the probabilities of these two models. In this approach, there is still the issue that the estimation of both probability models is likely to be unreliable or have a low degree of confidence while there are not enough occurrences of the context, even for the fast probability model.

The two probability estimates $P_0$ and $P_1$ are updated independently with different adaptation rates as follows:

$$P_0^{new} = \begin{cases} P_0^{old} + ((2^k - P_0^{old}) >> M_i), & \text{if inputs in } '1' \\ P_0^{old} - (P_0^{old} >> M_i), & \text{if inputs in } '0', \end{cases} \quad (5)$$

$$P_1^{new} = \begin{cases} P_1^{old} + ((2^k - P_1^{old}) >> 8), & \text{if inputs in } '1' \\ P_j^{old} - (P_j^{old} >> 8), & \text{if inputs in } '0'. \end{cases}$$

where $P_j^{old}$ and $P_j^{new}$ (j=0, 1) represent the probabilities before and after decoding a bin, respectively. The variable $M_i$ (being, e.g., 4, 5, 6, 7) is a parameter which controls the probability updating speed for the context model with index equal to " ". The variable k represents the precision of representation of the probabilities (e.g., 15), meaning that Pi (i=0 or 1) takes its values from 0 to (2^k−1): Pi=(2^k−1) corresponds to a probability of 1. The probability estimate P used for the interval subdivision in the binary arithmetic coder is the average of the estimates from the two hypotheses:

$$P=(P_0^{new}+P_1^{new})/2 \quad (6)$$

According to the present disclosure, it is proposed to use more than one context per bin, and to adaptively select one of the contexts for the actual entropy coding, based on the number of occurrences of each context. A context in a plurality of contexts per bin is associated with a set of types of blocks including at least one type of block. Different contexts in the set of contexts are associated with different sets of types of blocks. The sets of block types may be determined based on shape and/or size of the blocks. The sets of block types may also be determined based on the coding mode of the blocks, or based on the coefficient scanning mode of the blocks.

The idea may be applied for the coding of the significant coefficient flag (significant-coeff-flag), coefficient absolute level greater than one flag (coeff-abs-level-greater1-flag), coefficient absolute level greater than two flag (coeff-abs-level-greater2-flag), coefficient sign flag (coeff-sign-flag), and coefficient absolute level remaining (coeff-abs-level-remaining). The concept may be generalized for the coding of other syntax elements or symbols. Examples of other syntax elements are:

transform_skip_flag, indicating if the transform for the block is skipped or not cbf_luma, cbf_cb, cbf_cr—indicating if the TB (Luma, Chroma cb or Chroma cr) contains non-zero coefficients merge_flag, indicating if a CU is merged or not split_transform_flag, indicating if a TU is split or not In the prior art, for one contextual information instance (e.g., numSig=1, $reg_{idx}$=1, log 2BlkSize=3), one single context is identified, used to code the symbol, and updated once the symbol has been coded.

On the other hand, the present disclosure includes the following elements:

i. a set of contexts may be associated with one contextual information instance;

ii. a number of occurrences or occurrence information (and/or corresponding state information) is attached to each context of the set of contexts. The number of occurrences (and/or state information) is updated for each of the contexts once the element has been coded;

iii. the selection of the context used to code the element, among this set of contexts, is made based on the number of occurrences and/or state information.

Figure 13:
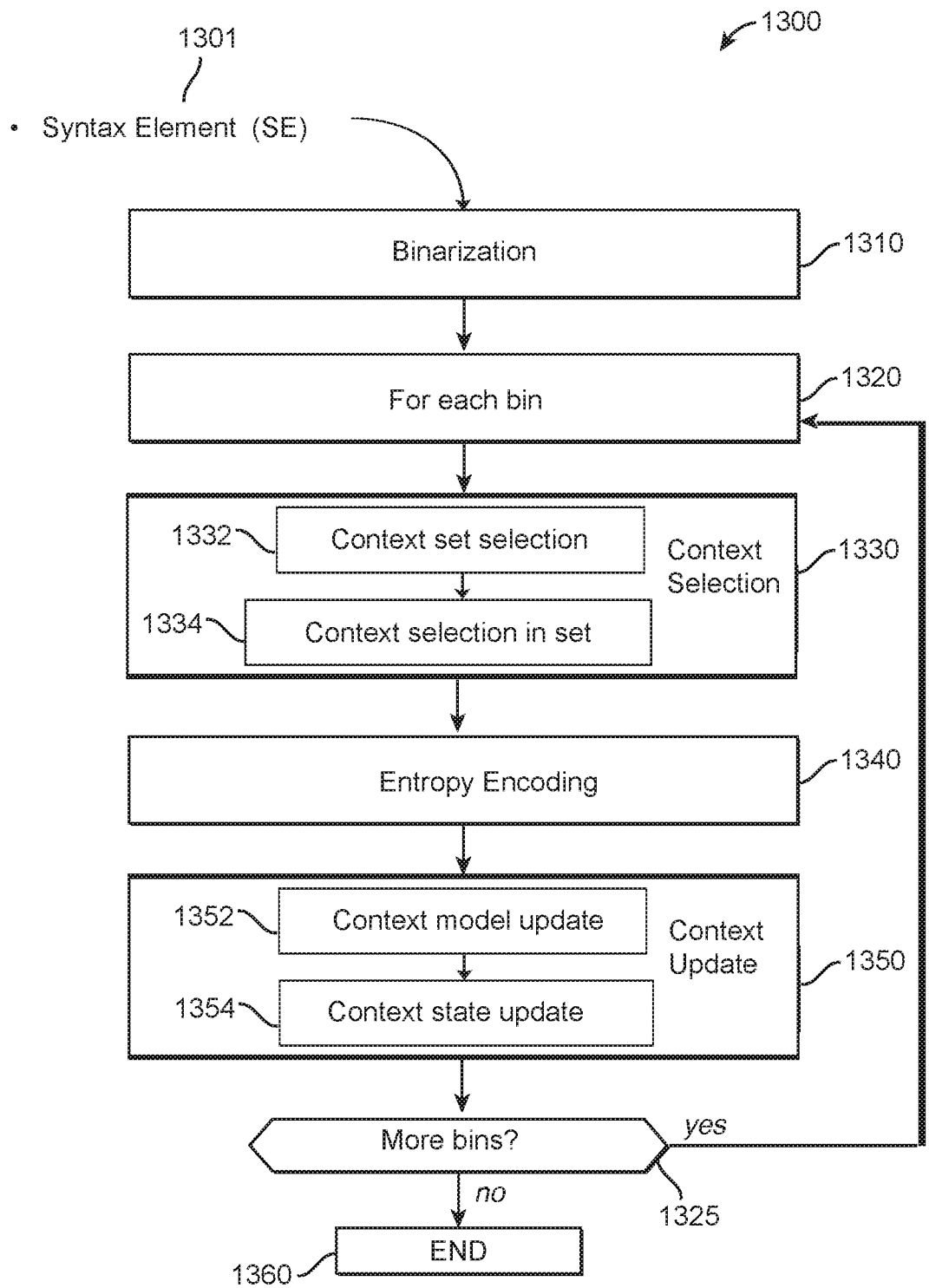
FIG. 13 illustrates a flowchart of an exemplary method of context-based entropy coding in accordance with an embodiment of the present disclosure.

FIG. 13 illustrates a flowchart 1300 of an exemplary method of context-based entropy coding (e.g., CABAC) in accordance with an embodiment of the present disclosure. FIG. 13 has similarities with FIG. 9. Steps 1310, 1320, 1340, 1325 and 1360 are similar to steps 910, 920, 940, 925 and 960, respectively. Steps 1330 and 1350 have important differences from steps 930 and 950, respectively, as explained below.

At step 1310, the syntax element (SE) 1301, when not already a binary value (such as a binary flag), is first binarized. Then, within loop 1320, for each bin:

a. At step 1330, a set of contexts is selected (step 1332) using contextual information of the syntax element to code. From this set of contexts, one context CTX is selected based on the number of occurrences or state information of the set of contexts (step 1334). The context CTX is associated to a context model that stores the contextual probability of the bin being "1" or "0". The contextual probability corresponds to the estimated conditional probability that the bin takes the value "b" knowing the context value CTX, i.e., P(b/CTX). The selection is based on contextual information, such as already-coded symbols (syntax elements) in the neighborhood of the current symbol (syntax element) to encode, the CU/PU/TU size or shape, the CU coding mode, the TB coefficients scanning mode or the slice type. In addition, the selection is a function of a number of occurrences or state information for the context set, as described below;

b. At step 1340, the bin is encoded using an entropy encoder (e.g., arithmetic encoder) according to the contextual probability P(b/CTX);

c. At step 1350, once the bin is coded, the context set is updated, i.e., the contextual probabilities for the context models belonging to the context set are updated (step 1352) and the number of occurrences or state information for each of the contexts in the context set is updated (step 1354). For example, the update may represent a count update of the number of occurrences of the bin value ("0" or "1"), and may also take in consideration the total number of bits. The state information means that there may be context switching during the encoding of bins of the same type (e.g., with same triplet (numSig, region index, block size)). The context switching may be dependent on the number of occurrences of the contexts.

d. At step 1325, check if there are more bins to encode. If yes, return to step 1320 (e.g., by moving to the next bin of the syntax element); otherwise, end the process at step 1360.

Without loss of generality, steps 1340 and 1350 may be switched in order or be performed in parallel.

It is to be understood that FIG. 10 may apply to the embodiments of the present disclosure, as long as ctxIncrement in steps 1040 and 1050 is the increment for the selected context CTX in step 1332, 1334. It is to be understood that FIGS. 11 and 12 may apply to the embodiments of the present disclosure if step 1290 is modified such that ctxIncrement is also a function of the state information. For example, step 1290 may be modified as follows:

$$ctxIncrement = region2_{offset} + num_{SIG} + state \qquad (7)$$

where state is an index for the state information (e.g., 1 to 3). Other linear or non-linear functions of the state may apply for ctxIncrement.

In one embodiment according to the present disclosure, the set of contexts for coding a syntax element or the bins of a syntax element belonging to a block of size (width, height) depends on the block size and shape or dimensions of the block. In one exemplary embodiment, for each possible value of numSig=C, region index $reg_{idx}$=R, the following set of contexts may be defined:

If the size of the block is (width×height)=4×4, the following set of contexts is defined:

$CTX_1$: 1 context for (numSig=C AND $reg_{idx}$=R AND block size=4×4)

$CTX_2$: 1 context for (numSig=C AND $reg_{idx}$=R AND block size=4×4, 4×8 or 8×4)

block size=4×4, 4×8 or 8×4 corresponds to log 2BlkSize≤2

$CTX_3$: 1 context for (numSig=C AND $reg_{idx}$=R AND block size≤8×8)

If the size of the block is (width×height)=4×8 or 8×4, the following set of contexts is defined:

$CTX_4$: 1 context for (numSig=C AND $reg_{idx}$=R AND block size=4×8 or 8×4)

$CTX_3$: 1 context for (numSig=C AND $reg_{idx}$=R AND block size≤8×8)

If the size of the block is (width×height)=8×8, the following set of contexts is defined:

$CTX_5$: 1 context for (numSig=C AND $reg_{idx}$=R AND block size=8×8)

$CTX_6$: 1 context for (numSig=C AND $reg_{idx}$=R AND block size=8×8, 16×8 or 8×16)

In one embodiment, the state information of one context $CTX_i$ may be associated with the number of occurrences $NbOcc_i$ of the corresponding context. $NbOcc_i$, which may be set to 0 at the beginning of a slice, a picture, a group of pictures, or video, and be incremented by 1 each time the context $CTX_i$ is selected. For instance, $NbOcc_1$ is incremented by 1 each time the context $CTX_1$ (numSig=C AND $reg_{idx}$=R AND block size=4×4) is selected. For example, a number of states may be established based on the values of $NbOcc_i$ as compared to threshold values for the states. Alternatively, $NbOcc_i$ may be set to a default pre-defined value at the beginning of a slice, a picture, a group of pictures, or video, the default pre-defined value being coded for each one or part of the set of contexts in the bitstream, at slice, tile, picture, or sequence level.

It may be observed in this embodiment that the contexts from a given set of contexts are super sets of each other, or contain/include each other in a sequential order. For instance, for the case where the size of the block is 4×4, the set of contexts is {$CTX_1$, $CTX_2$, $CTX_3$}. $CTX_2$ contains $CTX_1$, in the sense that the condition defining the context $CTX_2$ (numSig=C AND $reg_{idx}$=R AND block size=4×4, 4×8 or 8×4) involves the condition defining the context $CTX_1$ (numSig=C AND $reg_{idx}$=R AND block size=4×4). Similarly, $CTX_3$ contains $CTX_2$. Therefore, for a given set of contexts, the number of occurrences in this case increases with i: $NbOcc_3 >= NbOcc_2 >= NbOcc_1$. Other constructs in which the context are not super sets of each other are possible without departing from the scope of the present disclosure.

A context may then be seen as being broader or less strict/specific than another context if the condition defining the context includes the condition defining the other context. For example, $CTX_3$ is broader than $CTX_2$. Likewise, a context may then be seen as being narrower or more strict/specific than another context if the condition defining the context is included in the condition defining the other context. For example, $CTX_2$ is narrower than $CTX_3$.

The context selection in the set of contexts (step 1334) consists in selecting, from the set of contexts, a broader context while the narrower context has not been selected or occurred enough times. As soon as the narrower context has been selected enough times, the process switches to the narrower context. The narrower context is in principle more accurate. The state of the set of contexts defines or identifies the term "enough times" based on the number of occurrences of the various contexts in the set of contexts.

For instance, for the case where the size of the block is 4×4, the following selection process may apply:
  $CTX_3$ is selected (state=1);
  Otherwise, if $NbOcc_2 \geq Th_2$, then $CTX_2$ is selected (state=2);
  Otherwise, if $NbOcc_1 \geq Th_1$, then $CTX_1$ is selected (state=3).
where $Th_1$ and $Th_2$ are thresholds or levels of number of occurrences for state transitions. In one embodiment, the thresholds may be signaled into the bitstream, at the sequence, picture or slice level.

In terms of state information, the case where the size of the block is 4×4 may be alternately described as a sequence of states (1 to 3):
  Start at state=1 ($CTX_3$ is selected);
  Otherwise if $NbOcc_2 \geq Th_2$, then go to state=2 ($CTX_2$ is selected);
  Otherwise If $NbOcc_1 \geq Th_1$, then go to state=3 ($CTX_1$ is selected).
The examples described above may be easily generalized to other block sizes and/or shapes.

In one embodiment, specific contexts may be added for rectangular TBs of size A×B/B×A, with A different than B.

In an exemplary embodiment, the set of contexts for rectangular TBs of size A×B/B×A may include 2 contexts, 1 specific to the TB size/shape, and one more general gathering the TB size plus other TB sizes. For example, the set contexts for rectangular TBs of size A×B/B×A may include:
  1 context for TBs of rectangular size A×B/B×A
  1 context for TBs defined by the parameter log 2BlkSize
Examples of set contexts for rectangular TBs, according to this embodiment, are listed in Table 3.

TABLE 3

| TB size | Set of contexts |
|---|---|
| 4x8/8x4 | 1 context for 4x8/8x4 blocks |
|  | 1 context for blocks with log2BlkSize ≤ 2 |
| 4x16/16x4 | 1 context for 4x16/16x4 blocks |
|  | 1 context for blocks with log2BlkSize = 3 |
| 8x16/16x8 | 1 context for 8x16/16x8 blocks |
|  | 1 context for blocks with log2BlkSize = 3 |

TABLE 3-continued

| TB size | Set of contexts |
|---|---|
| 4x32/32x4 | 1 context for 4x32/32x4 blocks |
|  | 1 context for blocks with log2BlkSize = 3 |
| 8x32/32x8 | 1 context for 8x32/32x8 blocks |
|  | 1 context for blocks with log2BlkSize ≥ 4 |
| 16x32/32x16 | 1 context for 16x32/32x16 blocks |
|  | 1 context for blocks with log2BlkSize ≥ 4 |

For each of the context sets in Table 3, the state information of the context set is associated with the number of occurrences NbOcc of the contexts. The number of occurrences NbOcc of the context for blocks with log 2BlkSize≤2 corresponds to the number of occurrences of previously processed TBs such that log 2BlkSize≤2. The number of occurrences NbOcc of the context for 4×8/8×4 blocks corresponds to the number of occurrences of previously processed TBs with size 4×8 or 8×4.

For each of the context sets in Table 3, the second context is the initially selected context and a switch occurs to the first context as soon as there are enough occurrences for the first context (compared against a threshold or level).

In one embodiment, specific contexts may be added for TBs of size A×A.

In an exemplary embodiment, the set of contexts for square TBs of size A×A may include 2 contexts, 1 specific to the TB size/shape, and one more general gathering the TB size plus other TB sizes. For example, the set contexts for rectangular TBs of size A×A may include:
  1 context for TBs of square size A×A
  1 context for TBs defined by the parameter log 2BlkSize
Examples of set contexts for rectangular TBs, according to this embodiment, are listed in Table 4.

TABLE 4

| TB size | Set of contexts |
|---|---|
| 4x4 | 1 context for 4x4 blocks |
|  | 1 context for blocks with log2BlkSize ≤ 2 |
| 8x8 | 1 context for 8x8 blocks |
|  | 1 context for blocks with log2BlkSize = 3 |
| 16x16 | 1 context for 16x16 blocks |
|  | 1 context for blocks with log2BlkSize ≥ 4 |
| 32x32 | 1 context for 32x32 blocks |
|  | 1 context for blocks with log2BlkSize ≥ 4 |

For each of the context sets in Table 4, the state information of the context set is associated with the number of occurrences NbOcc of the contexts. The number of occurrences NbOcc of the context for blocks with log 2BlkSize≤2 corresponds to the number of occurrences of previously processed TBs such that log 2BlkSize≤2. The number of occurrences NbOcc of the context for 4×4 blocks corresponds to the number of occurrences of previously processed TBs with size 4×4.

For each of the context sets in Table 4, the second context is the initially selected context and a switch occurs to the first context as soon as there are enough occurrences for the first context (compared against a threshold or level).

In an embodiment, the square versus rectangular TBs shapes are separated, as illustrated in Table 5. In this case, some contexts are used in several sets of contexts. For instance, the context for blocks with log 2BlkSize≤2 is used for the set of contexts of TB size 4×4, and for the set of contexts of TB size 8×4/4×8. So in Table 5, a total of 9 contexts are used, instead of 3 in the prior-art:

1 context for blocks with log2BlkSize ≤ 2
1 context for blocks with log2BlkSize = 3
1 context for blocks with log2BlkSize ≥ 4
1 context for 4x4 blocks
1 context for 4x8/8x4 blocks
1 context for 8x8 blocks
1 context for 4x16/16x4, 8x16/16x8, 4x32/32x4 blocks
1 context for 16x16, 32x32 blocks
1 context for 8x32/32x8, 16x32/32x16 blocks

TABLE 5

| TB size | Set of contexts | log2BlkSize |
|---|---|---|
| 4x4 | 1 context for 4x4 blocks | 2 |
| | 1 context for blocks with log2BlkSize ≤ 2 | |
| 4x8/8x4 | 1 context for 4x8/8x4 blocks | 2 |
| | 1 context for blocks with log2BlkSize ≤ 2 | |
| 8x8 | 1 context for 8x8 blocks | 3 |
| | 1 context for blocks with log2BlkSize = 3 | |
| 4x16/16x4, 8x16/16x8, 4x32/32x4 | 1 context for 4x16/16x4, 8x16/16x8, 4x32/32x4 blocks | 3 |
| | 1 context for blocks with log2BlkSize = 3 | |
| 16x16, 32x32 | 1 context for 16x16, 32x32 blocks | 4 |
| | 1 context for blocks with log2BlkSize ≥ 4 | |
| 8x32/32x8, 16x32/32x16 | 1 context for 8x32/32x8, 16x32/32x16 blocks | 4 |
| | 1 context for blocks with log2BlkSize ≥ 4 | |

Figure 14:
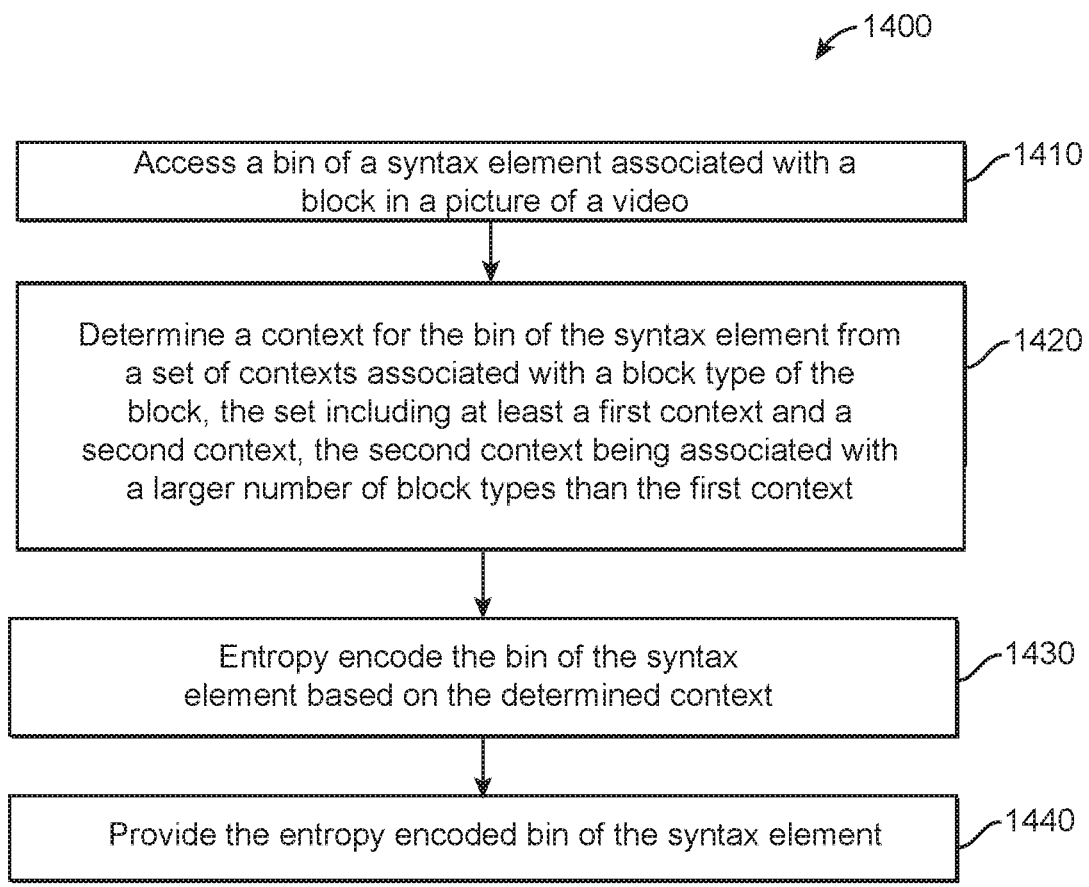
FIG. 14 illustrates a flowchart of an exemplary method of encoding in accordance with an embodiment of the present disclosure.

FIG. 14 illustrates a flowchart 1400 of an exemplary method of video encoding in accordance with one embodiment of the present disclosure. The method 1400 includes, at step 1410, accessing a bin of a syntax element associated with a block in a picture of a video. Then, at step 1420, the method 1400 includes determining a context for the bin of the syntax element from a set of contexts associated with a block type of the block, the set of contexts including at least a first context and a second context, the second context being associated with a larger number of block types than the first context. The step of determining 420 may be performed according to method 1300, particularly step 1330 or method 1000, particularly step 1050. The context may be identified by a context index as in step 1050. Finally, at step 1430, the method 400 includes entropy encoding the bin of the syntax element based on the determined context. The step of entropy encoding 430 may be performed according to method 1300, particularly step 1340, or method 1000, particularly step 1060.

In one embodiment, the method may further include, at step 1440, providing the entropy encoded bin of the syntax element. The step of providing may include outputting or providing to another module of the encoder. The step of providing may be optional, bypassed or removed.

Steps 1410 to 440 may be performed, e.g., by encoder 700, in particular, by entropy coding block 745. The method 400 may be performed for a plurality of bins of a syntax element, for a plurality of syntax elements (e.g., syntax elements associated with a plurality of transform coefficients in the block), and/or for a plurality of blocks in the picture. The method 400 may be performed for each bin of a syntax element, for each syntax element in a block and/or for each block in the picture.

According to one embodiment of the method, the context may be determined based on a number of prior selections or occurrences of the context. Similarly, the context may be determined based on state information associated with the number of occurrences.

According to one embodiment of the method, the context may be further determined based on a number of block types associated with the context.

According to one embodiment of the method, the second context may be associated with block types including the block types associated with the first context.

According to one embodiment of the method, the determined context may be the first context when a number of previous selections or occurrences of the first context exceeds a value.

According to one embodiment of the method, the determined context may be the second context when a number of previous selections of the first context is does not exceed (is smaller than or equal to) the value (or threshold).

According to one embodiment of the method, the number of previous selections may be determined for at least one picture of the video.

According to one embodiment of the method, a block type may be based on at least one of a block size and block shape.

According to one embodiment of the method, the set of contexts may be associated with the block type based on at least one of a block size and block shape.

According to one embodiment the method may further include determining a set of contexts associated with the block type.

According to one embodiment of the method, the syntax element may determine at least one of:
whether the transform coefficient is non-zero (significant-coeff-flag),
whether all the transform coefficients of the block are non-zero (e.g., CG significant flag),
whether the transform coefficient is greater than one (coeff-abs-level-greater1-flag),
whether the transform coefficient is greater than two (coeff-abs-level-greater2-flag),
a sign of the transform coefficient (coeff-sign-flag)
an absolute value remaining of the transform coefficient (coeff-abs-level-remaining)
whether a transform for the block is skipped (transform_skip_flag)
whether the TB Luma, Chroma cb or Chroma cr includes non-zero coefficients (cbf_luma, cbf_cb, cbf_cr)
whether a CU is merged (merge_flag)
whether a TU is split (split_transform_flag)
etc.

According to one embodiment of the method, the transform coefficient may be transformed according to one of a discrete cosine transform and a discrete sine transform.

According to one embodiment of the method, the entropy encoding may be a CABAC entropy encoding.

According to one embodiment, the method may further include receiving the picture, partitioning the picture into a plurality of blocks including the block, determining a prediction residual for the block, transforming and quantizing the residual to obtain a plurality of transform coefficients and entropy encoding the residual. The steps of transforming and quantizing may be performed by, e.g., modules 725 and 730 of encoder 700. The step of entropy encoding may be performed by, e.g., module 745 of encoder 700. The steps of receiving, transforming and quantizing may be optional, bypassed or removed, since they may have been previously performed by another device and/or the results may have been stored in memory.

It is to be understood that any of the embodiments of the method 400 described above may be implemented by encoder 700. The blocks of encoder 700 may be implemented by hardware (e.g., integrated circuits) or in software, stored in memory and executed by a processor.

Decoding

Figure 15:
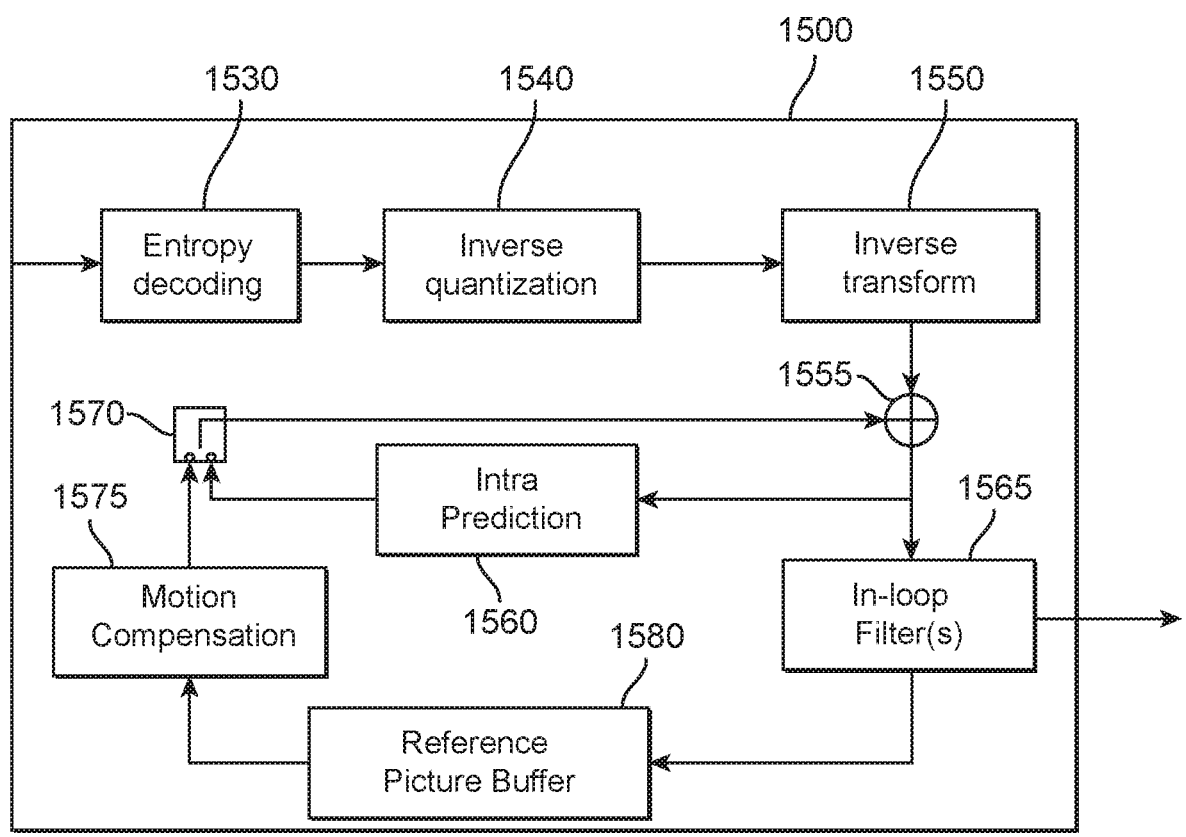
FIG. 15 illustrates a simplified block diagram of an exemplary video decoder in accordance with an embodiment of the present disclosure.

FIG. 15 illustrates a simplified block diagram of an exemplary video decoder 1500 in accordance with an embodiment of the present disclosure. The video decoder 1500 may be included in a receiver in a communication system. Video decoder 1500 generally performs a decoding pass reciprocal to the encoding pass performed by the video encoder 700 as described in FIG. 7. In particular, the input of the decoder 1500 includes a video bitstream, which may be generated by the video encoder 700. The bitstream is first entropy decoded (module 1530) to obtain transform coefficients, motion vectors, syntax elements and other coded information. The transform coefficients are de-quantized (module 1540) and inverse transformed (module 1550) to decode residuals. The decoded residuals are then combined (module 1555) with a predicted sample block (also known as a predictor) to obtain a decoded/reconstructed image block. The predicted sample block may be obtained (module 1570) from intra prediction (module 1560) or motion-compensated prediction (i.e., inter prediction) (module 1575). An in-loop filter (module 1565) may be applied to the reconstructed image. The in-loop filter may comprise a deblocking filter and a SAO filter. The filtered image is stored in a reference picture buffer 1580.

The modules of video decoder 1500 may be implemented in software and executed by a processor, or may be implemented by well-known circuits by one skilled in the art of compression. In particular video encoder 1500 may be implemented as an integrated circuit (IC), alone or combined with video decoder 700 as a codec.

The modules of video decoder 1500 are also present in other video decoders (e.g., HEVC decoders), except for the differences described in the present disclosure, particularly, differences in the block sizes and shapes, as in FIG. 6, and differences in the entropy decoding module 1530, as the reciprocal of module 745 of FIG. 7 according to the present disclosure, and as will be described in greater detail in the following paragraphs and figures. For functionalities other than entropy decoding (e.g., modules other than 1530), video decoder 1500 may be similar to an HEVC video decoder and the functionalities are not herein described in detail.

Entropy decoding

As previously described, in the HEVC standard and in the document JVET-C1001_v3 of the Joint Video Exploration Team of ISO/IEC JTC1/SC29/WG11, quantized coefficients contained in a so-called transform-block (TB) may be entropy coded and decoded using CABAC according to the exemplary patterns in FIG. 8, which illustrates an exemplary 8×8 TB. At the CABAC decoder the general reciprocal functions of the CABAC encoder are performed. CABAC and other context-based encoders and decoders are well-known by those skilled in the art of compression and are not herein described in detail. The present disclosure applies to general context-based entropy encoders and decoders (e.g., CABAC encoders and decoders) and relates to determining the context (e.g., context index) used for the entropy compression of elements (e.g., syntax elements) as a function of the shape of a TB, which may provide more compression efficiency, particularly, when the CUs are asymmetric.

The input to the process of CABAC decoding consists in the coded bitstream, typically conforming to the HEVC standard or a further evolution as in document JVET-C1001_v3 of the Joint Video Exploration Team of ISO/IEC JTC1/SC29/WG11. At any point of the decoding process, the decoder knows which syntax element is to be decoded next since it is fully specified in the standardized bitstream syntax and decoding process. Moreover, it also knows how the current syntax element to be decoded is binarized (i.e., represented as a sequence of binary symbols called bins, each equal to '1' or '0'), and how each bin of the bin string has been encoded.

Therefore, the first stage of the CABAC decoding process decodes a series of bins. For each bin, it knows if it has been encoded according to the bypass mode or the regular mode. The bypass mode consists in simply reading a bit in the bitstream and assigning the obtained bit value to the current bin. This mode has the advantage of being straightforward, hence fast, and typically used for bins that have a uniform statistical distribution, i.e. equal probability of being equal to 1' or '0'.

If the current bin has not been coded in bypass mode, then it has been coded in the regular mode, i.e. through context-based arithmetic coding. In regular mode, first, a context is obtained for the decoding of a current bin. The context is given by a context modeler module associated with the regular mode. The goal of the context is to obtain the conditional probability that the current bin has value '0', given some contextual prior or information X. The prior X is the value of some already decoded syntax element, available both on the encoder and decoder side in a synchronous way, at the time current bin is being decoded.

Typically, the prior X used for the decoding of a bin is specified in the standard, and is chosen because it is statistically correlated with the current bin to decode. The use of this contextual information permits reducing the rate cost of coding the bin, since the conditional entropy of the bin given X decreases as the bin and X correlation increases, as it is well-known in information theory ($H(bin|X) < H(bin)$, or the conditional entropy of bin knowing X is lower than the entropy of bin if bin and X are statistically correlated).

The contextual information X is thus used to obtain the probability of a current bin being '0' or '1'. Given these conditional probabilities, the regular decoding mode performs the arithmetic decoding of the binary value bin. The value of bin is then used to update the value of the conditional probabilities associated with current bin, knowing the current contextual information X. This is called the context model updating. Updating the context model for each bin as long as the bins are being decoded (or coded), allows progressively refining the context modeling for each binary element. Thus, the CABAC decoder progressively learns the statistical behavior of each regular encoded bin. The regular arithmetic decoding of current bin or its bypass decoding, depending on how it was coded, leads to a series of decoded bins.

It is to be understood that the context modeler and the context model updating steps are strictly identical operations on the CABAC encoder and on the decoder sides.

The second phase of the CABAC decoding, consists in converting this series of binary symbols into higher level syntax elements. A syntax element may take the form of a flag, in which case it directly takes the value of current decoded bins. On the other hand, if the binarization of current syntax element corresponds to a set of several bins according to a considered standard specification, a conversion step, called "Binary Codeword to Syntax Element" takes place. The conversion step is the reciprocal of the binarization step that was performed by the encoder. As an example, the standard binarization of the syntax elements results in the following encoded elements: last_sig_coeff_x_prefix, last_sig_coeff_y_prefix, last_sig_coeff_x_suffix, and last_sig_coeff_y_suffix. The inverse conversion performed by the decoder thus consists in obtaining the value of these syntax elements based on their respective decoded binarized versions.

An exemplary method of entropy decoding a significant coefficient flag in accordance with the prior art has similarities with FIG. 10, except for the step 1060, which then becomes the reciprocal of encode: "entropy decode the bin value" as a function of the context index.

Figure 16:
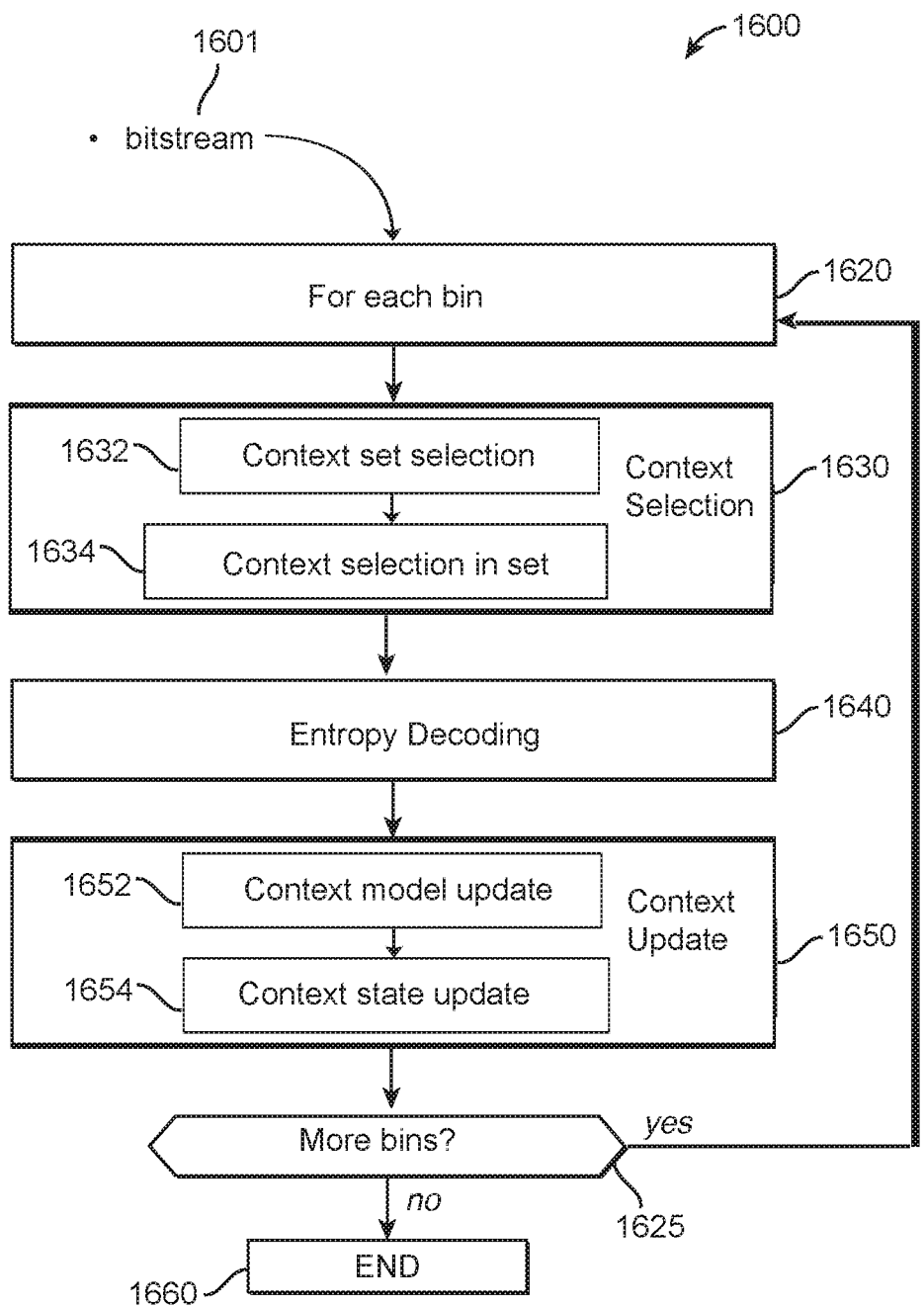
FIG. 16 illustrates a flowchart of an exemplary method of context-based entropy decoding in accordance with an embodiment of the present disclosure.

FIG. 16 illustrates a flowchart 1600 of an exemplary method of context-based entropy decoding (e.g., CABAC) in accordance with an embodiment of the present disclosure. FIG. 16 is the reciprocal of FIG. 13. The bitstream is received with encoded video, including entropy encoded syntax elements. Steps 1620, 1625, 1630, 1650 and 1660 are similar to steps 1320, 1325, 1330, 1350 and 1360, respectively and will not be further explained. Steps 1640 is the reciprocal of step 1340, in that it performs entropy decoding, instead of entropy encoding.

Without loss of generality, steps 1640 and 1650 may be switched in order or be performed in parallel.

It is to be understood that the thresholds or levels used to transition or switch from one context model to another in a set of context models may be included in the bitstream, encoded or not, and may be retrieved at the decoder in order to perform the method of FIG. 16.

Figure 17:
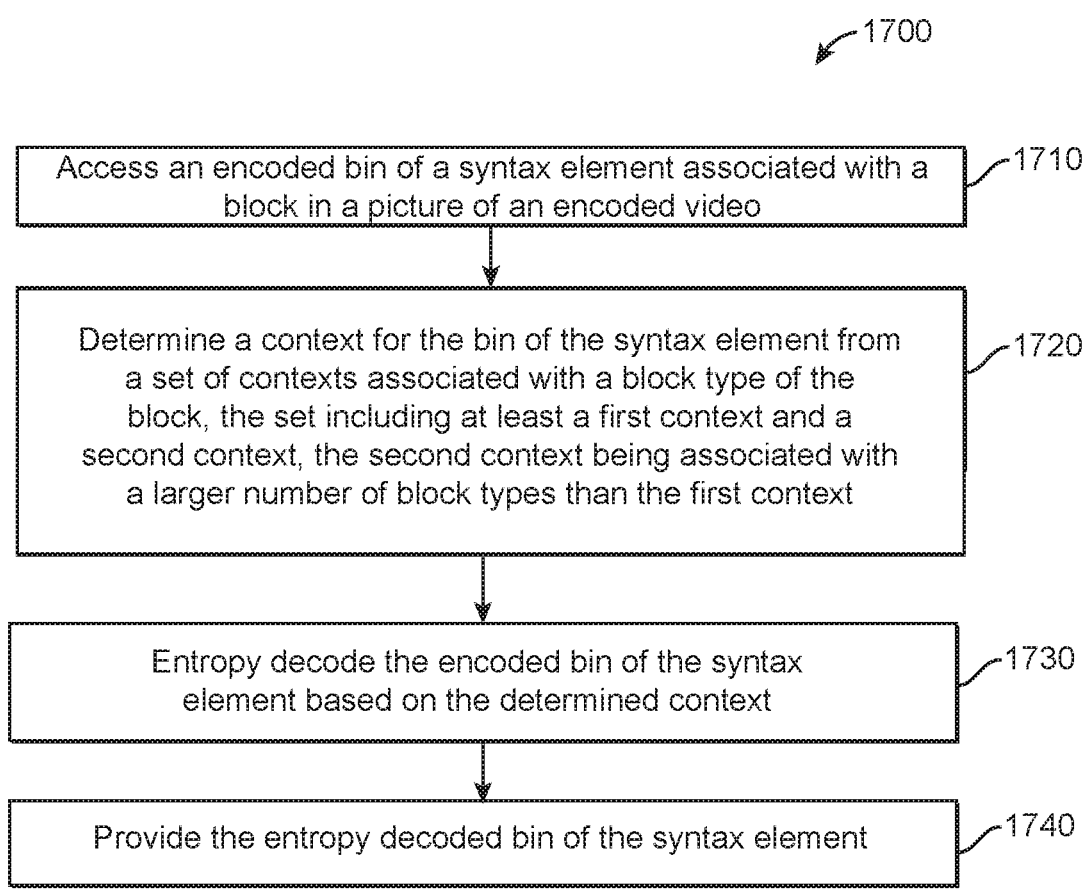
FIG. 17 illustrates a flowchart of an exemplary method of decoding in accordance with an embodiment of the present disclosure.

FIG. 17 illustrates a flowchart 1700 of an exemplary method of video decoding in accordance with one embodiment of the present disclosure. The method 1700 includes, at step 1710, accessing an encoded bin of a syntax element associated with a block in a picture of an encoded video. Then, at step 1717, the method 1700 includes determining a context for the bin of the syntax element from a set of contexts associated with a block type of the block, the set of contexts including at least a first context and a second context, the second context being associated with a larger number of block types than the first context. The step of determining 1720 may be performed according to method 1600, particularly step 1630. The context may be identified by a context index. Finally, at step 1730, the method 1700 includes entropy decoding the encoded bin of the syntax element based on the determined context. The step of entropy decoding 1730 may be performed according to method 1600, particularly step 16400.

In one embodiment, the method may further include, at step 1740, providing the entropy decoded bin of the syntax element. The step of providing may include outputting or providing to another module of the decoder. The step of providing may be optional, bypassed or removed.

Steps 1710 to 1740 may be performed, e.g., by decoder 1500, in particular by entropy decoding module 1530. The method 1700 may be performed for a plurality of bins of the syntax elements, for a plurality of syntax elements (e.g., associated with a plurality of transform coefficients) in the block and/or for a plurality of blocks in the picture. The method 1700 may be performed for each bin of the syntax element, for each syntax element in the block, and/or for each block in the picture.

According to one embodiment of the method, the context may be determined based on a number of prior selections or occurrences of the context. Similarly, the context may be determined based on state information associated with the number of occurrences.

According to one embodiment of the method, the context may be further determined based on a number of block types associated with the context.

According to one embodiment of the method, the second context may be associated with block types including the block types associated with the first context.

According to one embodiment of the method, the determined context may be the first context when a number of previous selections of the first context exceeds a value.

According to one embodiment of the method, the determined context may be the second context when a number of previous selections of the first context is does not exceed (is smaller than or equal to) the value (or threshold).

According to one embodiment of the method, the number of previous selections may be determined for at least one picture of the video.

According to one embodiment of the method, a block type may be based on at least one of a block size and block shape.

According to one embodiment of the method, the set of contexts may be associated with the block type based on at least one of a block size and block shape.

According to one embodiment the method may further include determining a set of contexts associated with the block type.

According to one embodiment of the method, the syntax element may determine at least one of:
whether the transform coefficient is non-zero (significant-coeff-flag),
whether all the transform coefficients of the block are non-zero (e.g., CG significant flag),
whether the transform coefficient is greater than one (coeff-abs-level-greater1-flag),
whether the transform coefficient is greater than two (coeff-abs-level-greater2-flag),
a sign of the transform coefficient (coeff-sign-flag)
an absolute value remaining of the transform coefficient (coeff-abs-level-remaining)
whether a transform for the block is skipped (trans-form_skip_flag)
whether the TB Luma, Chroma cb or Chroma cr includes non-zero coefficients (cbf_luma, cbf_cb, cbf_cr)
whether a CU is merged (merge_flag)
whether a TU is split (split_transform_flag)
etc.

According to one embodiment of the method, the transform coefficient may be transformed according to one of a discrete cosine transform and a discrete sine transform.

According to one embodiment of the method, the entropy decoding may be a CABAC entropy decoding.

According to one embodiment, the method may further include receiving the encoded picture, entropy decoding the block, inverse transforming the block to obtain decoded residuals, combining the decoded residuals with a predicted sample block to obtain a decoded/reconstructed image block. The transform coefficients may be further inverse quantized prior to inverse transformed. The steps of entropy decoding, inverse transforming and inverse quantizing may be performed by, e.g., modules 1530, 1550 and 1540 of decoder 1500, respectively. The steps of receiving, entropy decoding, inverse transforming and inverse quantizing, and combining may be optional, bypassed or removed, since they may have been previously performed by another device and/or provided to another device, or the results may have been retrieved from and/or stored in memory.

It is to be understood that any of the embodiments of the method 1700 described above may be implemented by decoder 1500. The blocks of decoder 1500 may be implemented by hardware (e.g., integrated circuits) or in software, stored in memory and executed by a processor.

Figure 18:
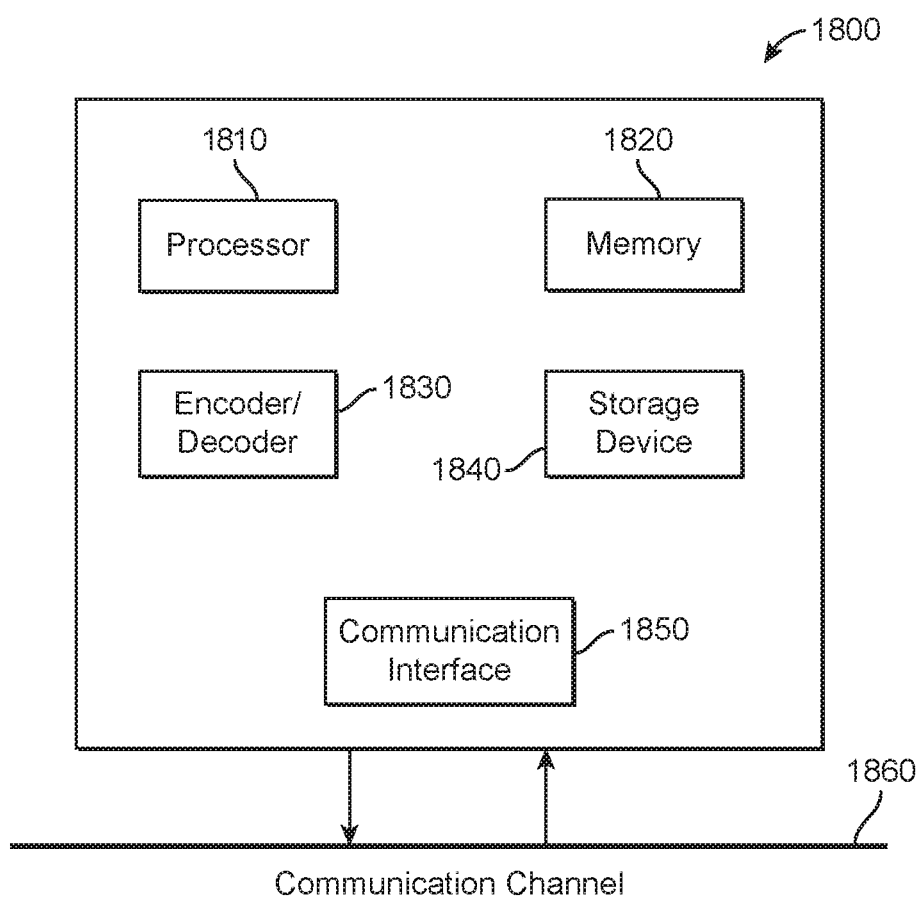
FIG. 18 illustrates a block diagram of a computing environment within which aspects of the present disclosure can be implemented and executed.

FIG. 18 illustrates a block diagram 1800 of an exemplary system in which various aspects of the exemplary embodiments of the present disclosure may be implemented. System 1800 may be embodied as a device including the various components described below and is configured to perform the processes described above. Examples of such devices, include, but are not limited to, personal computers, laptop computers, smartphones, smart watches, tablet computers, digital multimedia set top boxes, digital television receivers, personal video recording systems, connected home appliances, and servers. System 1800 may be communicatively coupled to other similar systems, and to a display via a communication channel as shown in FIG. 18 and as known by those skilled in the art to implement the exemplary video system described above. System 1800 may implement encoder 700, decoder 1500 or both, independently or jointly. Moreover, system 1800 may implement and be configured to execute any of the processes of the present disclosure, including method 1000, 1300, 1400, 1600 and/or 1700, independently or jointly.

The system 1800 may include at least one processor 1810 configured to execute instructions loaded therein for implementing the various processes as discussed above. Processor 1810 may include embedded memory, input output interface and various other circuitries as known in the art. The system 1800 may also include at least one memory 1820 (e.g., a volatile memory device such as RAM, a non-volatile memory device such as ROM). System 1800 may additionally include a storage device 1840, which may include non-volatile memory, including, but not limited to, an erasable programmable read-only memory (EPROM), ROM, a programmable read-only memory (PROM), a dynamic RAM (DRAM), a static RAM (SRAM), flash memory, magnetic disk drive, and/or optical disk drive. The storage device 1840 may comprise an internal storage device, an attached storage device and/or a network accessible storage device, as non-limiting examples. System 1800 may also include an encoder/decoder module 1830 configured to process data to provide an encoded video or decoded video.

Encoder/decoder module 1830 represents the module(s) that may be included in a device to perform the encoding and/or decoding functions, for example, according to FIGS. 7 and 15, respectively. As is known in the art of compression, a device may include one or both of the encoding and decoding modules. Additionally, encoder/decoder module 1830 may be implemented as a separate element of system 1800 or may be incorporated within processors 1810 as a combination of hardware and software as known to those skilled in the art. For example, encoder/decoder module 1830 may be implemented as one or two separate integrated circuits and/or field-programmable gate array (FPGA).

Program code to be loaded onto processors 1810 to perform the various processes described hereinabove may be stored in storage device 1840 and subsequently loaded onto memory 1820 for execution by processors 1810. In accordance with the exemplary embodiments of the present disclosure, one or more of the processor(s) 1810, memory 1820, storage device 1840 and encoder/decoder module 1830 may store one or more of the various items during the performance of the processes discussed herein above, including, but not limited to the input video, the decode video, the bitstream, equations, formula, matrices, variables, operations, and operational logic.

The system 1800 may also include communication interface 1850 that enables communication with other devices via communication channel 1860. The communication interface 1850 may include, but is not limited to a transceiver configured to transmit and receive data from communication channel 1860. The communication interface may include, but is not limited to, a modem or network card and the communication channel may be implemented within a wired and/or wireless medium. The various components of system 1800 may be connected or communicatively coupled together using various suitable connections, including, but not limited to internal buses, wires, and printed circuit boards.

The exemplary embodiments according to the present disclosure may be carried out by computer software executed by the processor 1810 or by hardware, or by a combination of hardware and software. As a non-limiting example, the exemplary embodiments according to the present disclosure may be implemented by one or more integrated circuits. The memory 1820 may be of any type appropriate to the technical environment and may be implemented using any appropriate data storage technology, such as optical memory devices, magnetic memory devices, semiconductor-based memory devices, fixed memory and removable memory, as non-limiting examples. The processor 1810 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants (PDAs), and other devices that facilitate communication of information between end-users.

According to an aspect of the present disclosure, an apparatus 1800 for video encoding is provided, the apparatus including a processor 1810, and at least one memory 1820, 1840 coupled to the processor, the processor 1810 being configured to perform any of the embodiments of the method of video encoding 1400 described above.

According to an aspect of the present disclosure, an apparatus 1800 for video decoding is provided, the apparatus including a processor 1810, and at least one memory 1820, 1840 coupled to the processor, the processor 1810 being configured to perform any of the embodiments of the method of video decoding 1700 described above.

According to an aspect of the present disclosure, an apparatus for video encoding is provided including means for accessing a bin of a syntax element associated with a block in a picture of a video, means for determining a context for the bin of the syntax element from a set of contexts associated with a block type of the block, the set of contexts including at least a first context and a second context, the second context being associated with a larger number of block types than the first context and means for entropy encoding the bin of the syntax element based on the determined context. The video encoders of FIGS. 7 and 18 may include the structure or means of the apparatus, particularly, blocks 745, 1810 and 1830.

According to an aspect of the present disclosure, an apparatus for video decoding is provided including means for accessing an encoded bin of a syntax element associated with a block in a picture of an encoded video, means for determining a context for the bin of the syntax element from a set of contexts associated with a block type of the block, the set of contexts including at least a first context and a second context, the second context being associated with a larger number of block types than the first context and means for entropy decoding the encoded bin of syntax element based on the determined context. FIGS. 15 and 18 may include the structure or means of the apparatus for video decoding, particularly, blocks 1530, 1810 and 1830.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to an aspect of the present disclosure, a signal including a bitstream formatted to include encoded data representative of a block of a picture, the encoded data encoded according to any of the embodiments of the method 1400 of video encoding.

According to an aspect of the present disclosure, a bitstream formatted to include encoded data representative of a block of a picture, the encoded data encoded according to any of the embodiments of the method 1400 of video encoding.

Moreover, any of the methods 1000, 1400, 1900 and/or 1700 may be implemented as a computer program product (independently or jointly) comprising computer executable instructions which may be executed by a processor. The computer program product having the computer-executable instructions may be stored in the respective transitory or non-transitory computer-readable storage media of the system 1800, encoder 700 and/or decoder 1500.

According to an aspect of the present disclosure, a computer-readable program product is provided including program code instructions for performing any of the embodiments of any of the methods 1000, 1300, 1400, 1600 and/or 1700 (independently or jointly) of the present disclosure.

It is important to note that one or more of the elements in the processes 1000, 1300, 1400, 1600 and/or 1700 may be combined, performed in a different order, or excluded in some embodiments while still implementing the aspects of the present disclosure. Other steps may be performed in parallel, where the processor does not wait for a full completion of a step before starting another.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a ROM, EPROM, Flash memory, a portable compact disc read-only memory (CD-ROM), an optical storage device, a magnetic storage device, or any suitable combination of the foregoing.

According to an aspect of the present disclosure, a computer-readable storage medium carrying a software program is provided including program code instructions for performing any of the embodiments of any of the methods of the present disclosure, including methods 1000, 1300, 1400, 1600 and/or 1700.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment.

Additionally, the present disclosure or its claims may refer to "determining" various pieces of information. Determining the information may include one or more of, for example, estimating the information, calculating the information, predicting the information, selecting the information or retrieving the information from memory.

Also, the present disclosure or its claims may refer to "providing" various pieces of information. Providing the information may include one or more of, for example, outputting the information, storing the information, transmitting the information, sending the information, displaying the information, showing the information, processing the information, or moving the information.

Moreover, the present disclosure or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information.

Further, the present disclosure or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the processes of present disclosure are programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method of video encoding comprising:
    accessing a bin of a syntax element associated with a block in a picture of a video, the syntax element being a transform coefficient level syntax element associated to one transform coefficient of the block indicating at least one of whether the transform coefficient is non-zero, whether the transform coefficient is greater than one, whether the transform coefficient is greater than two, a sign of the transform coefficient, and an absolute value remaining of the transform coefficient;
    obtaining a set of contexts associated with a block type of the block, said set of contexts including at least a first context and a second context, said second context being associated with a larger number of block types than the first context and including the block types associated with the first context, the block type of a block being based on at least one of a block size and a block shape of said block;
    selecting a context for the bin of the syntax element from the set of contexts based at least on a number of occurrences of previously processed blocks having a block type associated to the first context, the second context being selected instead of the first context until a condition on the number of occurrences of previously processed blocks having a block type associated with the first context is fulfilled; and,
    entropy encoding the bin of the syntax element based on the determined context.

2. The method of claim 1, wherein said first context is selected as soon as a number of prior selections of said first context exceeds a value.

3. The method of claim 2, wherein the number of previous selections is determined for at least one picture of said video.

4. A non-transitory computer-readable storage medium carrying a software program including program code instructions for implementing the method according to claim 1.

5. An apparatus for video encoding comprising electronic circuitry adapted to:
    access a bin of a syntax element associated with a block in a picture of a video, the syntax element being a transform coefficient level syntax element associated to one transform coefficient of the block indicating at least one of whether the transform coefficient is non-zero, whether the transform coefficient is greater than one, whether the transform coefficient is greater than two, a sign of the transform coefficient, and an absolute value remaining of the transform coefficient;
    obtain a set of contexts associated with a block type of the block, said set of contexts including at least a first context and a second context, said second context being associated with a larger number of block types than the first context and including the block types associated with the first context, the block type of a block being based on at least one of a block size and a block shape of said block;
    select a context for the bin of the syntax element from the set of contexts based at least on a number of occurrences of previously processed blocks having a block type associated to the first context, the second context being selected instead of the first context until a condition on the number of occurrences of previously processed blocks having a block type associated with the first context is fulfilled; and
    entropy encode the bin of the syntax element based on the determined context.

6. The apparatus of claim 5, wherein said first context is selected as soon as a number of prior selections of said first context exceeds a value.

7. The apparatus of claim 6, wherein the number of previous selections is determined for at least one picture of said video.

8. A method of video decoding comprising:
    accessing an encoded bin of a syntax element associated with a block in a picture of an encoded video, the syntax element being a transform coefficient level syntax element associated to one transform coefficient of the block indicating at least one of whether the transform coefficient is non-zero, whether the transform coefficient is greater than one, whether the transform coefficient is greater than two, a sign of the transform coefficient, and an absolute value remaining of the transform coefficient;
    obtaining a set of contexts associated with a block type of the block, said set of contexts including at least a first context and a second context, said second context being associated with a larger number of block types than the first context and including the block types associated with the first context, the block type of a block being based on at least one of a block size and a block shape of said block;

selecting a context for the bin of the syntax element from the set of contexts based at least on a number of occurrences of previously processed blocks having a block type associated to the first context, the second context being selected instead of the first context until a condition on the number of occurrences of previously processed blocks having a block type associated with the first context is fulfilled; and entropy decoding the encoded bin of the syntax element based on the determined context.

9. The method of claim 8, wherein said first context is selected as soon as a number of prior selections of said first context exceeds a value.

10. The method of claim 9, wherein the number of previous selections is determined for at least one picture of said video.

11. A non-transitory computer-readable storage medium carrying a software program including program code instructions for implementing the method according to claim 8.

12. An apparatus for video decoding comprising electronic circuitry adapted to:

access an encoded bin of a syntax element associated with a block in a picture of an encoded video, the syntax element being a transform coefficient level syntax element associated to one transform coefficient of the block indicating at least one of whether the transform coefficient is non-zero, whether the transform coefficient is greater than one, whether the transform coefficient is greater than two, a sign of the transform coefficient, and an absolute value remaining of the transform coefficient;

obtain a set of contexts associated with a block type of the block, said set of contexts including at least a first context and a second context, said second context being associated with a larger number of block types than the first context and including the block types associated with the first context, the block type of a block being based on at least one of a block size and a block shape of said block;

select a context for the bin of the syntax element from the set of contexts based at least on a number of occurrences of previously processed blocks having a block type associated to the first context, the second context being selected instead of the first context until a condition on the number of occurrences of previously processed blocks having a block type associated with the first context is fulfilled; and entropy decode the encoded bin of the syntax element based on the determined context.

13. The apparatus of claim 12, wherein said first context is selected as soon as a number of prior selections of said first context exceeds a value.

14. The apparatus of claim 13, wherein the number of previous selections is determined for at least one picture of said video.

* * * * *